US012726997B2

(12) United States Patent
Gou et al.

(10) Patent No.: US 12,726,997 B2
(45) **Date of Patent: *Sep. 1, 2026**

(54) INFORMATION TRANSMISSION METHOD AND APPARATUS

(71) Applicant: ZTE Corporation, Shenzhen (CN)

(72) Inventors: Wei Gou, Shenzhen (CN); Peng Hao, Shenzhen (CN); Zhisong Zuo, Shenzhen (CN); Chenchen Zhang, Shenzhen (CN); Min Ren, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 291 days.

This patent is subject to a terminal disclaimer.

(21) Appl. No.: 18/731,525

(22) Filed: Jun. 3, 2024

(65) Prior Publication Data

US 2024/0323972 A1 Sep. 26, 2024

Related U.S. Application Data

(63) Continuation of application No. 17/290,338, filed as application No. PCT/CN2019/114072 on Oct. 29, 2019, now Pat. No. 12,035,322.

(30) Foreign Application Priority Data

Nov. 2, 2018 (CN) ......................... 201811303073.2

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1819* (2013.01); *H04L 1/1896* (2013.01); *H04W 72/0446* (2013.01); *H04W 72/1263* (2013.01)

(58) Field of Classification Search
CPC ... H04L 1/1819; H04L 1/1854; H04L 1/1896; H04L 5/0055; H04L 1/1607
See application file for complete search history.

(56) References Cited

U.S. PATENT DOCUMENTS

2016/0337086 A1 11/2016 Shen et al.
2017/0141903 A1 5/2017 Xu et al.
(Continued)

FOREIGN PATENT DOCUMENTS

CN 108282276 A 7/2018
CN 108292974 A 7/2018
(Continued)

OTHER PUBLICATIONS

Cmcc, Downlink HARQ-ACK feedback timing, 3GPP TSG RAN WG1 Meeting #88bis, Spokane, USA Apr. 3-7, 2017, R1-1705106.
(Continued)

*Primary Examiner* — Zhensheng Zhang
(74) *Attorney, Agent, or Firm* — CANTOR COLBURN LLP

(57) ABSTRACT

The disclosure provides an information transmission method and apparatus. The method includes: carrying a first parameter in physical layer signaling corresponding to a Physical Downlink Shared Channel (PDSCH); and transmitting, according to an indication of the first parameter, a Hybrid Automatic Repeat Request Acknowledgment (HARQ-ACK) corresponding to the PDSCH, which may be specifically identifying an indication meaning of the current first parameter on a predetermined basis and selecting which positions are used to transmit the HARQ-ACK. By adopting the above solution, a first communication node itself sets a position at which an HARQ-ACK is transmitted, and a second communication node feeds back, according to an indication, the HARQ-ACK corresponding to a PDSCH in time, thereby solving the problem of greater delay for
(Continued)

HARQ-ACK feedback in the related art, and ensuring the low delay processing of a service.

15 Claims, 3 Drawing Sheets

(51) Int. Cl.
*H04L 1/1867* (2023.01)
*H04W 72/0446* (2023.01)
*H04W 72/1263* (2023.01)

(56) References Cited

U.S. PATENT DOCUMENTS

| | | | | |
|---|---|---|---|---|
| 2018/0019843 | A1 | 1/2018 | Papasakellariou | |
| 2018/0241510 | A1 | 8/2018 | Shen | |
| 2020/0280980 | A1 | 9/2020 | Myung et al. | |
| 2020/0281011 | A1* | 9/2020 | Xiong | H04W 72/20 |
| 2020/0366417 | A1* | 11/2020 | Lei | H04L 1/1685 |
| 2022/0038242 | A1* | 2/2022 | Yoshioka | H04W 72/23 |

FOREIGN PATENT DOCUMENTS

| | | | |
|---|---|---|---|
| CN | 108633070 | A | 10/2018 |
| WO | 2018126932 | A1 | 7/2018 |

OTHER PUBLICATIONS

European Search Report for corresponding application EP19879453; Report dated Mar. 17, 2022.
InterDigital Inc., HARQ Enhancements for NR-U 3GPP TSG RAN WG1 Meeting #94bis R1-1811206 Chengdu, China, Oct. 8-12, 2018.
International Search Report for corresponding application PCT/CN2019/114072 filed Oct. 29, 2019; Mail date Jan. 17, 2020.
Non-Final Office Action dated Oct. 17, 2023.
NTT DOCOMO Inc, “Physical Layer Enhancements for NR URLLC”, 3GPP TSG RAN WG1 Meeting #94, Aug. 20, 2018 R1-1809163.
NTT DOCOMO, Inc, Layer 1 Enhancements for NR URLLC, 3GPP TSG RAN WG1 Meeting #94bis Chengdu, China Oct. 8-12, 2018, R1-1811378.

* cited by examiner

INFORMATION TRANSMISSION METHOD AND APPARATUS

TECHNICAL FIELD

The disclosure relates to, but is not limited to, the field of communications, and more particularly, to an information transmission method and apparatus.

BACKGROUND

In a related art, in a feedback mechanism of a Hybrid Automatic Repeat Request Acknowledgment (HARQ-ACK) codebook corresponding to a Physical Downlink Shared Channel (PDSCH), the chance of transmitting an HARQ-ACK in one uplink unit is limited, so that HARQ-ACK feedback is delayed.

In order to solve the problem of greater delay for HARQ-ACK feedback in the related art, no effective solution is proposed at present.

SUMMARY

An embodiment of the disclosure provides an information transmission method and apparatus for at least solving the problem of greater delay for HARQ-ACK feedback in the related art.

According to another embodiment of the disclosure, an information transmission method is also provided, which may include that: physical layer signaling corresponding to a PDSCH is received, wherein the physical layer signaling carries a first parameter; and an HARQ-ACK corresponding to the PDSCH is transmitted according to an indication of the first parameter.

According to another embodiment of the disclosure, an information transmission method is also provided, which may include that: Downlink Control Information (DCI) corresponding to a PDSCH is received, wherein the DCI supports different Cyclic Redundancy Check (CRC) bit generator polynomials or supports scrambling based on different Radio Network Temporary Identity (RNTI) sequence; and an HARQ-ACK corresponding to the PDSCH is transmitted according to an indication of the CRC bit generator polynomials or scrambling based on the RNTI sequence of the DCI.

According to another embodiment of the disclosure, an information transmission method is also provided, which may include that: DCI corresponding to a PDSCH is received, wherein the DCI includes a Physical Uplink Control Channel (PUCCH) Resource Indicator (PRI); and an HARQ-ACK corresponding to the PDSCH is transmitted according to a value of the PRI.

According to another embodiment of the disclosure, an information transmission method is also provided, which may include that: physical layer signaling is transmitted to a second communication node in a PDSCH, wherein the physical layer signaling carries a first parameter for indicating the second communication node to select a first type of PUCCH, and the first type of PUCCH is used for transmitting an HARQ-ACK corresponding to the PDSCH.

According to another embodiment of the disclosure, an information transmission method is also provided, which may include that: DCI is transmitted to a second communication node in a PDSCH, wherein the DCI supports different CRC bit generator polynomials or different RNTI sequence scramblers, the CRC bit generator polynomials or the RNTI sequence scramblers of the DCI is used for indicating the second communication node to select a first type of PUCCH, and the first type of PUCCH is used for transmitting an HARQ-ACK corresponding to the PDSCH.

According to another embodiment of the disclosure, an information transmission method is also provided, which may include that: DCI is transmitted to a second communication node in a PDSCH, wherein a value of a PRI of the DCI is used for indicating the second communication node to select a first type of PUCCH, and the first type of PUCCH is used for transmitting an HARQ-ACK corresponding to the PDSCH.

According to another embodiment of the disclosure, an information transmission apparatus is also provided, which may include: a first receiving module, configured to receive physical layer signaling corresponding to a PDSCH, wherein the physical layer signaling carries a first parameter; and a first transmission module, configured to transmit, according to an indication of the first parameter, an HARQ-ACK corresponding to the PDSCH.

According to another embodiment of the disclosure, an information transmission apparatus is also provided, which may include: a second receiving module, configured to receive DCI corresponding to a PDSCH, wherein the DCI supports different CRC bit generator polynomials or supports scrambling based on different RNTI sequence; and a second transmission module, configured to transmit an HARQ-ACK corresponding to the PDSCH according to an indication of the CRC bit generator polynomials or scrambling based on the RNTI sequence of the DCI.

According to another embodiment of the disclosure, an information transmission apparatus is also provided, which may include: a third receiving module, configured to receive DCI corresponding to a PDSCH, wherein the DCI includes a PRI; and a third transmission module, configured to transmit an HARQ-ACK corresponding to the PDSCH according to a value of the PRI.

According to another embodiment of the disclosure, an information transmission apparatus is also provided, which may include: a fourth transmission module, configured to transmit physical layer signaling to a second communication node in a PDSCH, wherein the physical layer signaling carries a first parameter for indicating the second communication node to select a first type of PUCCH, and the first type of PUCCH is used for transmitting an HARQ-ACK corresponding to the PDSCH.

According to another embodiment of the disclosure, an information transmission apparatus is also provided, which may include: a fifth transmission module, configured to transmit DCI to a second communication node in a PDSCH, wherein the DCI supports different CRC bit generator polynomials or different RNTI sequence scramblers, the CRC bit generator polynomials or the RNTI sequence scramblers of the DCI is used for indicating the second communication node to select a first type of PUCCH, and the first type of PUCCH is used for transmitting an HARQ-ACK corresponding to the PDSCH.

According to another embodiment of the disclosure, an information transmission apparatus is also provided, which may include: a sixth transmission module, configured to transmit DCI to a second communication node in a PDSCH, wherein a value of a PRI of the DCI is used for indicating the second communication node to select a first type of PUCCH, and the first type of PUCCH is used for transmitting an HARQ-ACK corresponding to the PDSCH.

According to yet another embodiment of the disclosure, a storage medium is also provided. The storage medium may store a computer program that, when run, performs the operations in any one of the above method embodiments.

According to yet another embodiment of the disclosure, an electronic device is also provided. The electronic device may include a memory and a processor. The memory may store a computer program. The processor may be configured to run the computer program to perform the operations in any one of the above method embodiments.

Through the disclosure, a first parameter is carried in physical layer signaling corresponding to a PDSCH; and an HARQ-ACK corresponding to the PDSCH is transmitted according to an indication of the first parameter, which may be specifically identifying an indication meaning of the current first parameter on a predetermined basis and selecting which positions are used to transmit the HARQ-ACK. By adopting the above solution, a first communication node itself sets a position at which an HARQ-ACK is transmitted, and a second communication node feeds back, according to an indication, the HARQ-ACK corresponding to a PDSCH in time, thereby solving the problem of greater delay for HARQ-ACK feedback in the related art, and ensuring the low delay processing of a service.

BRIEF DESCRIPTION OF THE DRAWINGS

The accompanying drawings described herein are used to provide a further understanding of the application, and constitute a part of the application, and the exemplary embodiments of the application and the description thereof are used to explain the application, but do not constitute improper limitations to the application. In the drawings.

DETAILED DESCRIPTION OF THE EMBODIMENTS

Figure 1:
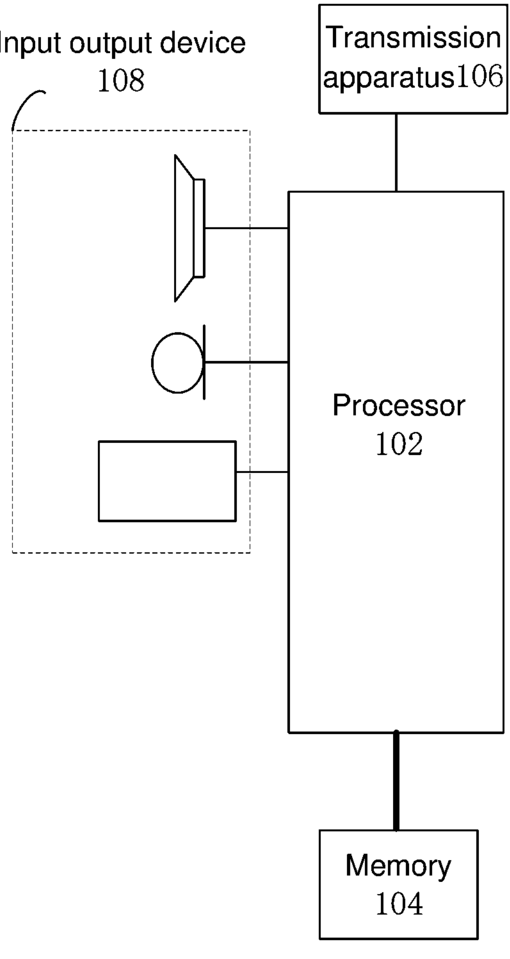
FIG. 1 is a block diagram of a hardware structure of a mobile terminal of an information transmission method according to an embodiment of the disclosure.

The disclosure is described below with reference to the drawings and in conjunction with the embodiments in detail. It is to be noted that embodiments in the disclosure and characteristics in the embodiments may be combined under the condition of no conflicts.

It is to be noted that the specification and claims of the disclosure and the terms “first”, “second” and the like in the drawings are used to distinguish similar objects, and do not need to describe a specific sequence or a precedence order.

An embodiment of the disclosure provides a mobile communication network (including, but not limited to, the 5th Generation mobile communication technology (5G) mobile communication network). The network architecture of this network may include a network-side device (e.g., base station) and a terminal. An information transmission method operable on the network architecture is provided in the present embodiment, and it is to be noted that an operation environment of the information transmission method provided in the present embodiment is not limited to the network architecture.

The method embodiment provided in the embodiment of the disclosure may be executed in a mobile terminal, a computer terminal or a similar computing apparatus. Running on a mobile terminal is taken as an example. FIG. 1 is a block diagram of a hardware structure of a mobile terminal of an information transmission method according to an embodiment of the disclosure. As shown in FIG. 1, the mobile terminal may include one or more (only one shown in FIG. 1) processor 102 (the processor 102 may include, but is not limited to, a processing apparatus such as a Micro Control Unit (MCU) or a Field Programmable Gate Array (FPGA) and a memory 104 configured to store data. Optionally, the mobile terminal may further include a transmission apparatus 106 configured as a communication function and an input output device 108. It will be understood by those skilled in the art that the structure shown in FIG. 1 is merely illustrative and does not limit the structure of the above mobile terminal. For example, the mobile terminal may also include more or fewer components than shown in FIG. 1, or has a different configuration from that shown in FIG. 1.

The memory 104 may be configured to store a software program and module of application software, such as a program instruction/module corresponding to an information transmission method in the embodiments of the disclosure. The processor 102 executes various functional applications and data processing, that is, implements the above method by running the software program and module stored in the memory 104. The memory 104 may include a high speed random access memory and may also include a non-volatile memory such as one or more magnetic storage apparatuses, a flash memory, or other non-volatile solid state memories. In some examples, the memory 104 may further include memories remotely located relative to the processor 102, which may be connected to the mobile terminal over a network. The examples of such networks include, but are not limited to, the Internet, the Intranet, local area networks, mobile communication networks, and combinations thereof.

The transmission apparatus 106 is configured to receive or send data over a network. The above specific network examples may include a wireless network provided by a communication provider of the mobile terminal. In one example, the transmission apparatus 106 includes a Network Interface Controller (NIC) that may be connected to other network devices through the s base station to communicate with the Internet. In one example, the transmission apparatus 106 may be a Radio Frequency (RF) module for communicating with the Internet wirelessly.

The solution of the present embodiment may be used between two communication nodes, optionally between a base station and a terminal. An uplink unit may be an uplink sub-frame, a slot, a subslot, or the like, or may be a unit composed of n consecutive Orthogonal Frequency Division Multiplexing (OFDM) symbols, the value of n may be pre-configured, and the value of n may be different in the unit composed of n OFDM symbols.

A first type of PUCCH described in the present embodiment may be a valid PUCCH in another subsequent embodiment, and a non-first type of PUCCH may be a non-valid PUCCH. A second type of PUCCH described in the present embodiment may be a valid PUCCH in another subsequent embodiment, and a non-second type of PUCCH may be a non-valid PUCCH. A relationship between the first type of PUCCH and the second PUCCH is not limited.

Figure 2:
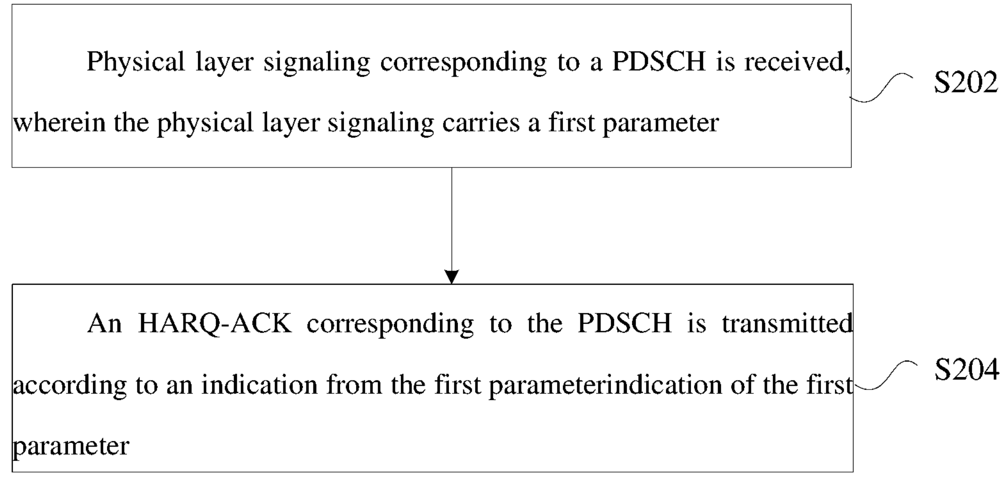
FIG. 2 is a flowchart of an information transmission method according to an embodiment of the application.

An information transmission method operating on the mobile terminal is provided in the present embodiment, and may be applicable to a terminal. FIG. 2 is a flowchart of an information transmission method according to an embodiment of the application. As shown in FIG. 2, the flow includes the following operations.

In operation S202, physical layer signaling corresponding to a PDSCH is received, wherein the physical layer signaling carries a first parameter.

In operation S204, an HARQ-ACK corresponding to the PDSCH is transmitted according to an indication of the first parameter.

The physical layer signaling may be DCI, or another physical layer signaling.

The HARQ-ACK may include an ACK message and a Non-Acknowledgment (NACK) message.

Through the above operations, a first parameter is carried in physical layer signaling corresponding to a PDSCH; and an HARQ-ACK corresponding to the PDSCH is transmitted according to an indication of the first parameter, which may be specifically identifying an indication meaning of the current first parameter on a predetermined basis and selecting which positions are used to transmit the HARQ-ACK. By adopting the above solution, a first communication node itself sets a position at which an HARQ-ACK is transmitted, and a second communication node feeds back, according to an indication, the HARQ-ACK corresponding to a PDSCH in time, thereby solving the problem of greater delay for HARQ-ACK feedback in the related art, and ensuring the low delay processing of a service.

Optionally, the operation that an HARQ-ACK corresponding to the PDSCH is transmitted according to an indication of the first parameter includes that: according to the indication of the first parameter, at least one of the following is determined: an HARQ-ACK codebook to which the HARQ-ACK corresponding to the PDSCH belongs is determined; a PUCCH corresponding to an HARQ-ACK codebook in an uplink unit is determined; a corresponding PUCCH of each HARQ-ACK corresponding to the PDSCH in an uplink unit is determined; and the HARQ-ACK corresponding to the PDSCH or the HARQ-ACK codebook is transmitted on the PUCCH.

Optionally, the physical layer signaling includes DCI, and the operation that the HARQ-ACK corresponding to the PDSCH is transmitted includes that: one or more PDSCHs scheduled by the DCI are detected, and HARQ-ACKs of the one or more PDSCHs belonging to an HARQ-ACK codebook and a PUCCH corresponding to the HARQ-ACK codebook are determined according to the indication of the first parameter in the physical layer signaling when the one or more HARQ-ACKs of the PDSCHs are required to be transmitted in the same uplink unit.

Optionally, the physical layer signaling carries the first parameter, and the physical layer signaling includes DCI.

The first parameter is used for indicating at least one of the following information:

- when the first parameter is a first numerical value, the first parameter is used for indicating that a PUCCH indicated by corresponding DCI is a first type of PUCCH, and when the first parameter is a second numerical value, the first parameter is used for indicating that a PUCCH indicated by corresponding DCI is a non-first type of PUCCH, wherein the first type of PUCCH is used for transmitting an HARQ-ACK;
- when the first parameter is a first numerical value, the first parameter is used for indicating that an HARQ-ACK of a PDSCH corresponding to corresponding DCI is the last HARQ-ACK of an HARQ-ACK codebook, and when the first parameter is a second numerical value, the first parameter is used for indicating that an HARQ-ACK of a PDSCH corresponding to corresponding DCI is not the last HARQ-ACK of an HARQ-ACK codebook, wherein the HARQ-ACK codebook is transmitted on a PUCCH indicated by the last DCI in the DCI corresponding to the HARQ-ACK codebook;
- when the first parameter is a first numerical value, the first parameter is used for indicating that corresponding DCI is DCI of the last PDSCH in a PDSCH corresponding to an HARQ-ACK codebook, and when the first parameter is a second numerical value, the first parameter is used for indicating that corresponding DCI is not DCI of the last PDSCH in a PDSCH corresponding to an HARQ-ACK codebook, wherein the HARQ-ACK codebook is transmitted on a PUCCH indicated by the last DCI in the DCI corresponding to the HARQ-ACK codebook; and
- when the first parameter is a first numerical value, the first parameter is used for indicating that one or more HARQ-ACKs to be transmitted prior to an HARQ-ACK of a PDSCH corresponding to current DCI is an HARQ-ACK codebook, and when the first parameter is a second numerical value, the first parameter is used for indicating that one or more HARQ-ACKs to be transmitted prior to an HARQ-ACK of a PDSCH corresponding to current DCI is not the last HARQ-ACK of an HARQ-ACK codebook until an HARQ-ACK of a PDSCH corresponding to current DCI, wherein the HARQ-ACK codebook is transmitted on a PUCCH indicated by the last DCI in the DCI corresponding to the HARQ-ACK codebook.

Optionally, the physical layer signaling carries the first parameter, and the physical layer signaling includes DCI.

The operation that an HARQ-ACK corresponding to the PDSCH is transmitted according to an indication of the first parameter includes at least one of the following:

A PUCCH indicated by DCI with a first parameter which is a first numerical value is selected as a second type of PUCCH, and an HARQ-ACK codebook is transmitted in the second type of PUCCH, wherein the HARQ-ACK codebook includes one or more HARQ-ACKs, and the HARQ-ACK codebook includes all HARQ-ACKs to be transmitted between a current second type of PUCCH and a previous second type of PUCCH.

Here, the HARQ-ACK includes the following three situations: HARQ-ACKs for a PDSCH with DCI scheduling, HARQ-ACKs for a Semi-Persistent Scheduling (SPS) Physical Downlink Control Channel (PDCCH) release and HARQ-ACKs for a SPS PDSCH without DCI scheduling.

When detecting that first parameters of all received DCI are second numerical values before a preset number of symbols ahead of a PUCCH in an uplink unit, a PUCCH indicated by the last DCI in all DCI is taken as a second type of PUCCH, and an HARQ-ACK codebook is transmitted in the second type of PUCCH, wherein the HARQ-ACK codebook includes all HARQ-ACKs to be transmitted between a current second type of PUCCH and a previous second type of PUCCH.

The preset number of symbols may be N1+X symbols described in another subsequent embodiment, and the preset number of symbols may be determined by the base station according to terminal computing power.

When detecting that a first parameter corresponding to first DCI is different from a first parameter of previous DCI, it is determined that a PUCCH indicated by the first DCI is a second type of PUCCH, and an HARQ-ACK codebook is transmitted in the second type of PUCCH, wherein the HARQ-ACK codebook includes an HARQ-ACK to be transmitted between a current second type of PUCCH and a previous second type of PUCCH.

When detecting that first parameters corresponding to all DCI received before a preset number of symbols ahead of a PUCCH in the uplink unit are the same, a PUCCH indicated by the last DCI in all DCI is taken as a second type of PUCCH, and an HARQ-ACK codebook is transmitted in the second type of PUCCH, wherein the HARQ-ACK codebook includes all HARQ-ACKs to be transmitted between a current second type of PUCCH and a previous second type of PUCCH.

According to another embodiment of the disclosure, an information transmission method is also provided, which may be applied to a terminal and includes the following operations.

In the first operation, DCI corresponding to a PDSCH is received, wherein the DCI supports different CRC bit generator polynomials or supports scrambling based on different RNTI sequence.

CRC_1 and CRC_2 in another subsequent embodiment correspond to two different CRC polynomials that generate CRC bits.

In the second operation, an HARQ-ACK corresponding to the PDSCH is transmitted according to an indication of the CRC bit generator polynomials or scrambling based on the RNTI sequence of the DCI.

By adopting the above solution, a first communication node itself sets a position at which an HARQ-ACK is transmitted, and a second communication node feeds back, according to an indication, the HARQ-ACK corresponding to a PDSCH in time, thereby solving the problem of greater delay for HARQ-ACK feedback in the related art, and ensuring the low delay processing of a service.

Optionally, the operation that the HARQ-ACK corresponding to the PDSCH is transmitted according to the indication of the CRC bit generator polynomials or scrambling based on the RNTI sequence of the DCI includes that: according to the indication of the CRC bit generator polynomials or the RNTI sequence scramblers of the DCI, at least one of the following is determined: an HARQ-ACK codebook to which an HARQ-ACK corresponding to the PDSCH belongs is determined; a PUCCH corresponding to an HARQ-ACK codebook in an uplink unit is determined; a PUCCH corresponding to each HARQ-ACK corresponding to the PDSCH in an uplink unit is determined; and the HARQ-ACK corresponding to the PDSCH is transmitted on the PUCCH.

Optionally, the CRC bit generator polynomials or the RNTI sequence scramblers of the DCI are used for indicating at least one of the following information:

- when the CRC bit generator polynomial is a first polynomial, the CRC bit generator polynomials or the RNTI sequence scramblers of the DCI are used for indicating that a PUCCH indicated by corresponding DCI is a first type of PUCCH, and when the CRC bit generator polynomial is a second polynomial, the CRC bit generator polynomials or the RNTI sequence scramblers of the DCI are used for indicating that a PUCCH indicated by corresponding DCI is a non-first type of PUCCH, wherein the first type of PUCCH is used for transmitting an HARQ-ACK;
- when the CRC bit generator polynomial is a first polynomial, the CRC bit generator polynomials or the RNTI sequence scramblers of the DCI are used for indicating that an HARQ-ACK of a PDSCH corresponding to corresponding DCI is the last HARQ-ACK of an HARQ-ACK codebook, and when the CRC bit generator polynomial is a second polynomial, the CRC bit generator polynomials or the RNTI sequence scramblers of the DCI are used for indicating that an HARQ-ACK of a PDSCH corresponding to corresponding DCI is not the last HARQ-ACK of an HARQ-ACK codebook, wherein the HARQ-ACK codebook is transmitted on a PUCCH indicated by the last DCI in the DCI corresponding to the HARQ-ACK codebook;
- when the CRC bit generator polynomial is a first polynomial, the CRC bit generator polynomials or the RNTI sequence scramblers of the DCI are used for indicating that corresponding DCI is DCI of the last PDSCH in a PDSCH corresponding to an HARQ-ACK codebook, and when the CRC bit generator polynomial is a second polynomial, the CRC bit generator polynomials or the RNTI sequence scramblers of the DCI are used for indicating that corresponding DCI is not DCI of the last PDSCH in a PDSCH corresponding to an HARQ-ACK codebook, wherein the HARQ-ACK codebook is transmitted on a PUCCH indicated by the last DCI in the DCI corresponding to the HARQ-ACK codebook;
- when the CRC bit generator polynomial is a first polynomial, the CRC bit generator polynomials or the RNTI sequence scramblers of the DCI are used for indicating that an HARQ-ACK to be transmitted before is an HARQ-ACK codebook until an HARQ-ACK of a PDSCH corresponding to current DCI, and when the CRC bit generator polynomial is a second polynomial, the CRC bit generator polynomials or the RNTI sequence scramblers of the DCI are used for indicating that it is not the last HARQ-ACK of an HARQ-ACK codebook until an HARQ-ACK of a PDSCH corresponding to current DCI, wherein the HARQ-ACK codebook is transmitted on a PUCCH indicated by the last DCI in the DCI corresponding to the HARQ-ACK codebook;
- when the RNTI sequence scrambler is a third sequence, the CRC bit generator polynomials or the RNTI sequence scramblers of the DCI are used for indicating that a PUCCH indicated by corresponding DCI is a first type of PUCCH, and when the RNTI sequence scrambler is a fourth sequence, the CRC bit generator polynomials or the RNTI sequence scramblers of the DCI are used for indicating that a PUCCH indicated by corresponding DCI is a non-first type of PUCCH, wherein the first type of PUCCH is used for transmitting an HARQ-ACK;
- when the RNTI sequence scrambler is a third sequence, the CRC bit generator polynomials or the RNTI sequence scramblers of the DCI are used for indicating that an HARQ-ACK of a PDSCH corresponding to corresponding DCI is the last HARQ-ACK of an HARQ-ACK codebook, and when the RNTI sequence scrambler is a fourth sequence, the CRC bit generator polynomials or the RNTI sequence scramblers of the DCI are used for indicating that an HARQ-ACK of a PDSCH corresponding to corresponding DCI is not the last HARQ-ACK of an HARQ-ACK codebook, wherein the HARQ-ACK codebook is transmitted on a PUCCH indicated by the last DCI in the DCI corresponding to the HARQ-ACK codebook;
- when the RNTI sequence scrambler is a third sequence, the CRC bit generator polynomials or the RNTI sequence scramblers of the DCI are used for indicating that corresponding DCI is DCI of the last PDSCH in a PDSCH corresponding to an HARQ-ACK codebook, and when the RNTI sequence scrambler is a fourth sequence, the CRC bit generator polynomials or the RNTI sequence scramblers of the DCI are used for indicating that corresponding DCI is not DCI of the last PDSCH in a PDSCH corresponding to an HARQ-ACK codebook, wherein the HARQ-ACK codebook is transmitted on a PUCCH indicated by the last DCI in the DCI corresponding to the HARQ-ACK codebook; and when the RNTI sequence scrambler is a third sequence, the CRC bit generator polynomials or the RNTI sequence scramblers of the DCI are used for indicating that an HARQ-ACK to be transmitted before is an HARQ-ACK codebook until an HARQ-ACK of a PDSCH corresponding to current DCI, and when the RNTI sequence scrambler is a fourth sequence, the CRC bit generator polynomials or the RNTI sequence scramblers of the DCI are used for indicating that it is not the last HARQ-ACK of an HARQ-ACK codebook until an HARQ-ACK of a PDSCH corresponding to current DCI, wherein the HARQ-ACK codebook is transmitted on a PUCCH indicated by the last DCI in the DCI corresponding to the HARQ-ACK codebook.

Optionally, the operation that the HARQ-ACK corresponding to the PDSCH is transmitted according to the indication of the CRC bit generator polynomials or scrambling based on the RNTI sequence of the DCI includes at least one of the following:

a PUCCH indicated by DCI with a CRC bit generator polynomial which is a first polynomial is selected as a second type of PUCCH, and an HARQ-ACK codebook is transmitted in the second type of PUCCH, wherein the HARQ-ACK codebook includes one or more HARQ-ACKs, and the HARQ-ACK codebook includes an HARQ-ACK to be transmitted between a current second type of PUCCH and a previous second type of PUCCH;

when detecting that CRC bit generator polynomials corresponding to all received DCI are second polynomials before a preset number of symbols ahead of a PUCCH in an uplink unit, a PUCCH indicated by the last DCI in all DCI is taken as a second type of PUCCH, and an HARQ-ACK codebook is transmitted in the second type of PUCCH, wherein the HARQ-ACK codebook includes all HARQ-ACKs to be transmitted between a current second type of PUCCH and a previous second type of PUCCH;

when detecting that a CRC bit generator polynomial corresponding to first DCI is different from a CRC bit generator polynomial of previous DCI, it is determined that a PUCCH indicated by the first DCI is a second type of PUCCH, and an HARQ-ACK codebook is transmitted in the second type of PUCCH, wherein the HARQ-ACK codebook includes an HARQ-ACK to be transmitted between a current second type of PUCCH and a previous second type of PUCCH;

when detecting that CRC bit generator polynomials corresponding to all DCI received before a preset number of symbols ahead of a PUCCH in the uplink unit are the same, a PUCCH indicated by the last DCI in all DCI is taken as a second type of PUCCH, and an HARQ-ACK codebook is transmitted in the second type of PUCCH, wherein the HARQ-ACK codebook includes all HARQ-ACKs to be transmitted between a current second type of PUCCH and a previous second type of PUCCH;

a PUCCH indicated by DCI with an RNTI sequence scrambler which is a third sequence is selected as a second type of PUCCH, and an HARQ-ACK codebook is transmitted in the second type of PUCCH, wherein the HARQ-ACK codebook includes one or more HARQ-ACKs, and the HARQ-ACK codebook includes an HARQ-ACK to be transmitted between a current second type of PUCCH and a previous second type of PUCCH;

when detecting that RNTI sequence scramblers corresponding to all DCI received are fourth sequences before a preset number of symbols ahead of a PUCCH in an uplink unit, a PUCCH indicated by the last DCI in all DCI is taken as a second type of PUCCH, and a HARQ-ACK codebook is transmitted in the second type of PUCCH, wherein the HARQ-ACK codebook includes all HARQ-ACKs to be transmitted between a current second type of PUCCH and a previous second type of PUCCH;

when detecting that a sequence of an RNTI sequence scrambler corresponding to first DCI is different from a sequence of an RNTI sequence scrambler of previous DCI, it is determined that a PUCCH indicated by the first DCI is a second type of PUCCH, and a HARQ-ACK codebook is transmitted in the second type of PUCCH, wherein the HARQ-ACK codebook includes a HARQ-ACK to be transmitted between a current second type of PUCCH and a previous second type of PUCCH; and when detecting that sequences of RNTI sequence scramblers corresponding to all received DCI are the same before a preset number of symbols ahead of a PUCCH in the uplink unit, a PUCCH indicated by the last DCI in all DCI is taken as a second type of PUCCH, and an HARQ-ACK codebook is transmitted in the second type of PUCCH, wherein the HARQ-ACK codebook includes all HARQ-ACKs to be transmitted between a current second type of PUCCH and a previous second type of PUCCH.

According to another embodiment of the disclosure, an information transmission method is also provided, which is applied to a terminal and includes the following operations.

In the first operation, DCI corresponding to a PDSCH is received, wherein the DCI includes a PRI and a PUCCH.

In the second operation, an HARQ-ACK corresponding to the PDSCH is transmitted according to a value of the PRI.

By adopting the above solution, a first communication node itself sets a position at which an HARQ-ACK is transmitted, and a second communication node feeds back, according to an indication, the HARQ-ACK corresponding to a PDSCH in time, thereby solving the problem of greater delay for HARQ-ACK feedback in the related art, and ensuring the low delay processing of a service.

Optionally, the operation that the HARQ-ACK corresponding to the PDSCH is transmitted according to a value of the PRI includes that: according to the value of the PRI, at least one of the following is determined: an HARQ-ACK codebook to which an HARQ-ACK corresponding to the PDSCH belongs is determined; a PUCCH corresponding to an HARQ-ACK codebook in an uplink unit is determined; a PUCCH corresponding to each HARQ-ACK corresponding to the PDSCH in an uplink unit is determined; and the HARQ-ACK corresponding to the PDSCH is transmitted on the PUCCH or the HARQ-ACK codebook is transmitted on the PUCCH.

Optionally, the operation that an HARQ-ACK corresponding to the PDSCH is transmitted according to a value of the PRI includes one of the following:

- when the values of PRIs of a plurality of DCI are the same, a PUCCH indicated by the PRI in the last DCI is taken as a second type of PUCCH resource, and an HARQ-ACK codebook is transmitted in the second type of PUCCH, wherein the HARQ-ACK codebook includes one or more HARQ-ACKs, and the HARQ-ACK codebook includes an HARQ-ACK to be transmitted between a current second type of PUCCH and a previous second type of PUCCH, where in this case, it is a precondition that each time domain position is configured with PUCCH resources of multiple PUCCH sets; and
- when a PRI of first DCI is a first numerical value, a PUCCH indicated by the first DCI is taken as a non-second type of PUCCH, when a PRI of first DCI is a non-first numerical value, a PUCCH indicated by the first DCI is taken as a second type of PUCCH, and an HARQ-ACK codebook is transmitted in the second type of PUCCH, wherein the HARQ-ACK codebook includes one or more HARQ-ACKs, and the HARQ-ACK codebook includes an HARQ-ACK to be transmitted between a current second type of PUCCH and a previous second type of PUCCH.

Optionally, the first numerical value includes one number and the non-first numerical value includes seven numbers.

Optionally, the operation that when a PRI of first DCI is a first numerical value, a PUCCH indicated by the first DCI is taken as a non-second type of PUCCH, when a PRI of first DCI is a non-first numerical value, a PUCCH indicated by the first DCI is taken as a second type of PUCCH, and an HARQ-ACK codebook is transmitted in the second type of PUCCH includes that:

- when detecting that PRIs of all DCI received are the first numerical values before a preset number of symbols ahead of a PUCCH in an uplink unit, a PUCCH indicated by the last DCI in all DCI is taken as a second type of PUCCH, and an HARQ-ACK codebook is transmitted in the second type of PUCCH, wherein the HARQ-ACK codebook includes all HARQ-ACKs to be transmitted between a current second type of PUCCH and a previous second type of PUCCH.

Optionally, the value of the PRI includes one of the following:

- when a PRI of first DCI is a non-first numerical value, indicating that a PUCCH indicated by corresponding DCI is a first type of PUCCH, and when a PRI of first DCI is a first numerical value, indicating that a PUCCH indicated by corresponding DCI is a non-first type of PUCCH, wherein the first type of PUCCH is used for transmitting an HARQ-ACK;
- when a PRI of first DCI is a non-first numerical value, indicating that an HARQ-ACK of a PDSCH corresponding to corresponding DCI is the last HARQ-ACK of an HARQ-ACK codebook, and when a PRI of first DCI is a first numerical value, indicating that an HARQ-ACK of a PDSCH corresponding to corresponding DCI is not the last HARQ-ACK of an HARQ-ACK codebook, wherein the HARQ-ACK codebook is transmitted on a PUCCH indicated by the last DCI in the DCI corresponding to the HARQ-ACK codebook;
- when a PRI of first DCI is a non-first numerical value, indicating that corresponding DCI is DCI of the last PDSCH in a PDSCH corresponding to an HARQ-ACK codebook, and when a PRI of first DCI is a first numerical value, indicating that corresponding DCI is not DCI of the last PDSCH in a PDSCH corresponding to an HARQ-ACK codebook, wherein the HARQ-ACK codebook is transmitted on a PUCCH indicated by the last DCI in the DCI corresponding to the HARQ-ACK codebook; and
- when a PRI of first DCI is a non-first numerical value, indicating that an HARQ-ACK to be transmitted before is an HARQ-ACK codebook until an HARQ-ACK of a PDSCH corresponding to current DCI, and when a PRI of first DCI is a first numerical value, indicating that an HARQ-ACK to be transmitted before is not the last HARQ-ACK of an HARQ-ACK codebook until an HARQ-ACK of a PDSCH corresponding to current DCI, wherein the HARQ-ACK codebook is transmitted on a PUCCH indicated by the last DCI in the DCI corresponding to the HARQ-ACK codebook.

Optionally, the operation that the HARQ-ACK corresponding to the PDSCH is transmitted according to a value of the PRI includes at least one of the following:

- a PUCCH indicated by DCI with a PRI as a non-first numerical value is selected as a second type of PUCCH, and an HARQ-ACK codebook is transmitted in the second type of PUCCH, wherein the HARQ-ACK codebook includes one or more HARQ-ACKs, and the HARQ-ACK codebook includes all HARQ-ACKs to be transmitted between a current second type of PUCCH and a previous second type of PUCCH;
- when detecting that PRIs of all received DCI are the first numerical values before a preset number of symbols ahead of a PUCCH in an uplink unit, a PUCCH indicated by the last DCI in all DCI is taken as a second type of PUCCH, and an HARQ-ACK codebook is transmitted in the second type of PUCCH, wherein the HARQ-ACK codebook includes all HARQ-ACKs to be transmitted between a current second type of PUCCH and a previous second type of PUCCH;
- when detecting that a PRI corresponding to first DCI is different from a PRI of previous DCI, it is determined that a PUCCH indicated by the first DCI is a second type of PUCCH, and an HARQ-ACK codebook is transmitted in the second type of PUCCH, wherein the HARQ-ACK codebook includes an HARQ-ACK to be transmitted between a current second type of PUCCH and a previous second type of PUCCH; and
- When detecting that PRIs corresponding to all received DCI are the same before a preset number of symbols ahead of a PUCCH in the uplink unit, a PUCCH indicated by the last DCI in all DCI is taken as a second type of PUCCH, and an HARQ-ACK codebook is transmitted in the second type of PUCCH, wherein the HARQ-ACK codebook includes all HARQ-ACKs to be transmitted between a current second type of PUCCH and a previous second type of PUCCH.

According to another embodiment of the disclosure, an information transmission method is also provided, which may be applied to a base station and includes the following operations.

Physical layer signaling is transmitted to a second communication node in a PDSCH, wherein the physical layer signaling carries a first parameter for indicating the second communication node to select a first type of PUCCH, and the first type of PUCCH is used for transmitting an HARQ-ACK corresponding to the PDSCH.

By adopting the above solution, a first communication node itself sets a position at which an HARQ-ACK is transmitted, and a second communication node feeds back, according to an indication, the HARQ-ACK corresponding to a PDSCH in time, thereby solving the problem of greater delay for HARQ-ACK feedback in the related art, and ensuring the low delay processing of a service.

According to another embodiment of the disclosure, an information transmission method is also provided, which includes the following operation.

DCI is transmitted to a second communication node in a PDSCH, wherein the DCI supports different CRC bit generator polynomials or different RNTI sequence scramblers, the CRC bit generator polynomials or the RNTI sequence scramblers of the DCI is used for indicating the second communication node to select a first type of PUCCH, and the first type of PUCCH is used for transmitting an HARQ-ACK corresponding to the PDSCH.

By adopting the above solution, a first communication node itself sets a position at which an HARQ-ACK is transmitted, and a second communication node feeds back, according to an indication, the HARQ-ACK corresponding to a PDSCH in time, thereby solving the problem of greater delay for HARQ-ACK feedback in the related art, and ensuring the low delay processing of a service.

According to another embodiment of the disclosure, an information transmission method is also provided, which includes the following operation.

DCI is transmitted to a second communication node in a PDSCH, wherein a value of a PRI of the DCI is used for indicating the second communication node to select a first type of PUCCH, and the first type of PUCCH is used for transmitting an HARQ-ACK corresponding to the PDSCH.

By adopting the above solution, a first communication node itself sets a position at which an HARQ-ACK is transmitted, and a second communication node feeds back, according to an indication, the HARQ-ACK corresponding to a PDSCH in time, thereby solving the problem of greater delay for HARQ-ACK feedback in the related art, and ensuring the low delay processing of a service.

Another embodiment of the disclosure is described below.

Figure 3:
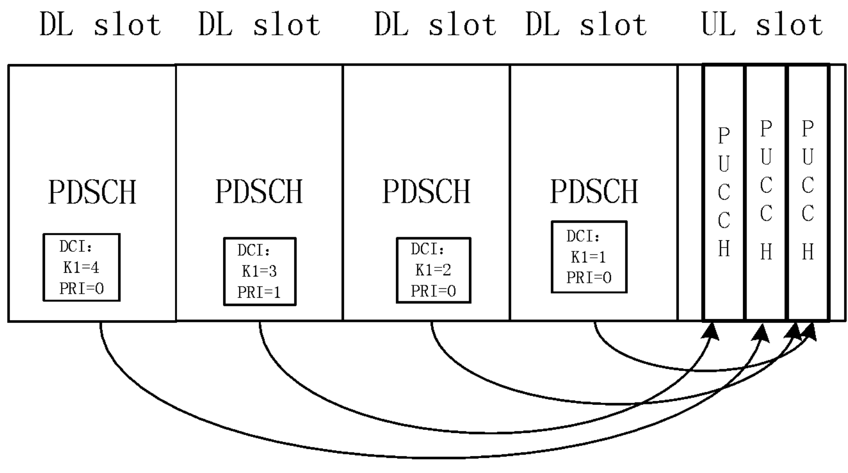
FIG. 3 is a schematic diagram of HARQ-ACK feedback according to the related art.

The size of the HARQ-ACK codebook and the corresponding PUCCH resources in the related art are determined in the following manner. FIG. 3 is a schematic diagram of HARQ-ACK feedback according to the related art. As shown in FIG. 3, there are four PDSCHs respectively scheduled by DCI, and corresponding slot positions for HARQ-ACK feedback (indicated by k1, k1 is the number of slot intervals) and corresponding PUCCH resources (indicated by a PRI) in the slot of slot n+k1 (n indicates a slot in which the PDSCH is transmitted) are configured in the DCI. Furthermore, since the value of k1 in the DCIs of the four PDSCHs indicates the same uplink slot, the PRI indicated by the last DCI in the DCIs is a PUCCH resource which finally feeds back HARQ-ACKs corresponding to the four PDSCHs (i.e., HARQ-ACK information corresponding to each of the four PDSCHs is connected in series as an HARQ-ACK codebook and then the HARQ-ACK codebook is transmitted in the PUCCH resource). For example, the DCI corresponding to the first PDSCH includes k1=4 and PRI=0; the DCI corresponding to the second PDSCH includes k1=3 and PRI=1; the DCI corresponding to the third PDSCH includes k1=2 and PRI=0; and the DCI corresponding to the fourth PDSCH includes k1=1 and PRI=0. In a further related art, the method further includes that: a corresponding PUCCH set is determined according to a bit number of HARQ-ACK feedback, and a PUCCH resource indicated by the PRI is selected 5 from the corresponding set according to the PRI. And the related art provides that the PUCCH resource in PUCCH set 0 can only transmit 1-2 bit UCI (including HARQ-ACK) information, in the remaining PUCCH sets, there is also a corresponding UCI (including HARQ-ACK) information transmission range, and the UCI information ranges corresponding to the PUCCH sets do not overlap with each other. For example, there are two PUCCH sets, the UCI information transmission range of PUCCH set 0 is 1-2 bit, and the UCI information transmission range of PUCCH set 1 is greater than 2 bit. Thus, in FIG. 3, the PRI indicated by the DCI of the first PDSCH is 0, and the PRI indicated by the DCI of the third PDSCH is 0, but the PUCCH resources indicated by the DCIs belong to different PUCCH sets and therefore the PUCCH resources indicated by the DCIs are different.

In the related art, the PUCCH resource indicated in the last DCI is always selected from multiple DCIs indicating the same slot for HARQ-ACK feedback as the PUCCH resource fed back by the HARQ-ACK of the PDSCH corresponding to the multiple DCIs. Thus, in FIG. 3, HARQ-ACKs of the four PDSCHs are actually multiplexed together and can only be carried by PUCCH resources indicated in the DCI corresponding to the fourth PDSCH. Obviously, the mechanism of the related art cannot be implemented to distinguish the PUCCH resources of the HARQ-ACK feedback of the first PDSCHs and the PUCCH resources of the HARQ-ACK feedback of the last PDSCHs into two PUCCH resources in FIG. 3.

This is equivalent to the fact that the HARQ-ACKs of the first PDSCHs cannot be fed back in the PUCCH ahead in the time domain in a UL slot illustrated in FIG. 3, eventually resulting in the delay of HARQ-ACK feedback. This is also because the HARQ-ACK preparation of the PDSCH corresponding to the last DCI requires a certain processing time, so the PUCCH resources corresponding to the HARQ-ACK of the latter PDSCH can only be located later in the UL slot illustrated in FIG. 3. Just as in the related art, the HARQ-ACKs of the first PDSCHs can only be transmitted in the PUCCH resource indicated by the last DCI. Thus there is a delay in the HARQ-ACK feedback of the first PDSCHs. The related art mechanisms may also be summarized as having only one HARQ-ACK transmission opportunity in one UL slot.

If the PDSCH is a PDSCH of an Ultra Reliable Low Latency Communication (URLLC), it is apparent that the related art mechanism will delay the feedback of the HARQ-ACKs of the first URLLC PDSCHs. The delay is not acceptable for URLLC because it is very critical for the timeliness requirements of services. Therefore, in the case of HARQ-ACK feedback for URLLC services, it is necessary to consider optimizing the related art mechanisms to reduce the HARQ-ACK feedback delay, that is, to give a way to implement multiple HARQ-ACK transmission opportunities in one UL slot (described herein in units of slots, the slot may be actually replaced by other units, such as subslot, or several consecutive OFDM symbols constitute one unit, or multiple slots or subslots constitute one unit, but the processing is the same).

In another embodiment of the disclosure, the following specific embodiments exist.

In all specific embodiments below, a PUCCH set is determined according to the size of an HARQ-ACK codebook or the number of bits, and then corresponding PUCCH resources are selected in the determined PUCCH set according to a PRI. It is apparent here that it is not only limited to the size of the HARQ-ACK codebook, but may be the number of UCI bits to be transmitted. Here, the UCI may include HARQ-ACK, SR and CSI, then the PUCCH set is determined according to the bits of UCI to be transmitted, and then the corresponding PUCCH resources are selected in the determined PUCCH set according to the PRI.

Specific Embodiment 1

A parameter is introduced at a physical layer. The parameter is set in preference to DCI. The parameter is used to determine whether a PUCCH resource indicated in the DCI is a valid PUCCH resource for feeding back an HARQ-ACK codebook (a PUCCH resource indicated by the DCI, if it is not specifically stated, the PUCCH resource is indicated by a PRI in the DCI; if the PRI has other statements, other statements prevail, all embodiments below are similar). An uplink unit here may be an uplink sub-frame, a slot, a subslot, or the like, or may be a unit composed of n consecutive OFDM symbols, the value of n may be preconfigured, and the value of n may be different in the unit composed of n OFDM symbols. The description of the uplink unit in the following specific embodiments is the same as herein.

When the same uplink unit is indicated in one or more DCI to feed back HARQ-ACK information of a PDSCH scheduled by the DCI, the parameter is included in the DCI, and the parameter is used to indicate whether a PUCCH resource indicated by the current DCI is a valid PUCCH resource for feeding back an HARQ-ACK.

With respect to a non-valid PUCCH resource for feeding back the HARQ-ACK, a valid PUCCH resource for feeding back an HARQ-ACK can replace the previous non-valid PUCCH resource, which is considered to be a PUCCH resource required to transmit the HARQ-ACK codebook (or the valid PUCCH resource replaces the previous non-valid PUCCH resource, and the HARQ-ACK scheduled to be sent by the non-valid PUCCH resource is also transmitted in the valid PUCCH resource).

If the PUCCH resource indicated by the received current DCI are marked as a valid PUCCH resource, the HARQ-ACK information of the PDSCH (also scheduled) corresponding to the DCI received before the current DCI (also including the current DCI) is multiplexed together to serve as an HARQ-ACK codebook and is sent in the PUCCH resource indicated by the current DCI. It is noted that a forward cutoff position before the current DCI starts after the last DCI corresponding to the last HARQ-ACK codebook.

For example, the parameter is 1 bit overhead, 1 bit is 1, indicating a valid PUCCH resource for feeding back an HARQ-ACK, and 1 bit is 0, indicating a non-valid PUCCH resource for feeding back an HARQ-ACK.

If parameter values in the DCI received by a UE are all 0 at a PUCCH resource indicated in the uplink unit (here, at an N1+X duration before the PUCCH resource indicated in the uplink unit, N1+X at least including: time when the UE processes a PDSCH and forms corresponding HARQ-ACKs), the PUCCH resource indicated in the last DCI in the received DCI is used as a valid PUCCH resource, and the HARQ-ACKs of the PDSCH corresponding to the DCI are multiplexed together and transmitted in the valid PUCCH resource as an HARQ-ACK codebook. The mode can effectively overcome the situation that when a base station schedules the PDSCH by the current DCI, whether the PDSCH is scheduled by the subsequent DCI cannot be predicted.

In addition, the parameter may also consider whether a bit value of the parameter in the DCI before and after is reversed to express whether the PUCCH resource indicated by the corresponding DCI is a valid PUCCH resource. For example, the PUCCH resource indicated in the DCI where the parameter value is reversed is a valid PUCCH resource for feeding back an HARQ-ACK. If parameters in the DCI received by the UE are not reversed at a PUCCH resource indicated in the uplink unit (here, at an N1+X duration before the PUCCH resource indicated in the uplink unit, N1+X at least including: time when the UE processes a PDSCH and forms corresponding HARQ-ACKs), the PUCCH resource indicated in the last DCI in the received DCI is used as a valid PUCCH resource, and the HARQ-ACKs of the PDSCH corresponding to the DCI are multiplexed together and transmitted in the valid PUCCH resource as an HARQ-ACK codebook. The mode can effectively overcome the situation that when a base station schedules the PDSCH by the current DCI, whether the PDSCH is scheduled by the subsequent DCI cannot be predicted.

Figure 4:
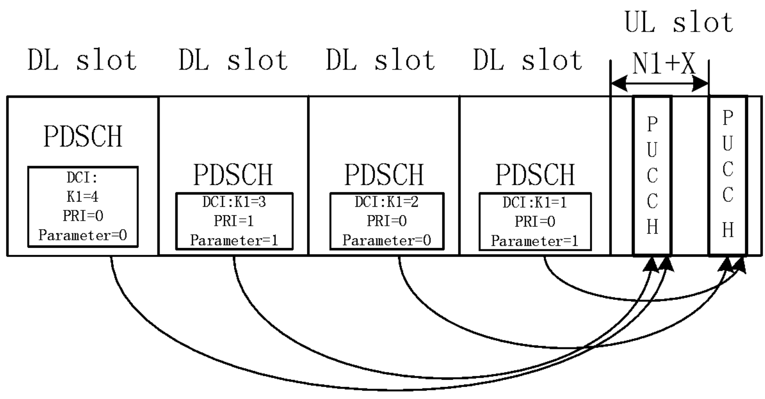
FIG. 4 is a schematic diagram of Specific Embodiment 1 according to another embodiment of the disclosure.

An example is as shown in FIG. 4. FIG. 4 is a schematic diagram of Specific Embodiment 1 according to another embodiment of the disclosure. As shown in FIG. 4, it is assumed that four PDSCHs are scheduled by DCI, besides, K1, PRI and the parameter values are carried in the DCI, and the K1 points to the same UL slot (if the first PDSCH is in DL slot n, K1=4, the slot pointed by the K1 is slot n+K1, and the unit of the K1 is slot; K1 may also be a unit of subslot or the like, in which case it is assumed that K1 points to the same subslot and the processing mechanism is the same). In FIG. 4, there are two PUCCH resources in a pointed UL slot, and a PRI of DCI of the first PDSCH points to a first PUCCH resource in the UL slot. In this case, the parameter in the DCI of the first PDSCH is set to 0, that is, the PUCCH resource indicated by the PRI in the DCI is a non-valid PUCCH resource. In the similar DCI of the second PDSCH, K1=3, PRI=1, pointing to the same UL slot as the UL slot pointed by the DCI corresponding to the first PDSCH, and the parameter is set to 1, so that the PUCCH resource indicated by the DCI corresponding to the second PDSCH may be confirmed to be a valid PUCCH resource. Thus, HARQ-ACKs of the PDSCH corresponding to the DCI received before the DCI (current included) are multiplexed together as an HARQ-ACK codebook for transmission in the valid PUCCH resource. That is, the HARQ-ACKs of the first PDSCH and the second PDSCH are multiplexed together as an HARQ-ACK codebook, and the HARQ-ACK codebook is transmitted in a PUCCH resource indicated by the DCI of the second PDSCH. K1=2 and PRI=0 in the DCI corresponding to the third PDSCH. In this case, the parameter is set to 0. K1=1 and PRI=0 in the DCI corresponding to the fourth PDSCH. In this case, the parameter is set to 1. Thus, a valid PUCCH resource is indicated in the DCI of the fourth PDSCH. Thus, HARQ-ACKs of PDSCHs corresponding to the DCI received before the DCI (included) corresponding to the fourth PDSCH are multiplexed together as an HARQ-ACK codebook for transmission in the valid PUCCH resource. The HARQ-ACK codebook actually includes HARQ-ACKs of the third PDSCH and the fourth PDSCH (the reason why there are no HARQ-ACKs of the first and second PDSCHs is that the HARQ-ACKs of the first and second PDSCHs have been already transmitted in the valid PUCCH resource indicated by the DCI of the second PDSCH as an HARQ-ACK, the transmission starting with the DCI after the last DCI in the previous HARQ-ACK codebook, i.e. the DCI of the third PDSCH, until the current DCI is selected), which are multiplexed together as an HARQ-ACK codebook and transmitted in a PUCCH resource indicated by the DCI of the fourth PDSCH.

There is also another special case. For example, if the parameter values in the DCI of the first, second, third and fourth PDSCHs (assuming that K1 points to the same slot, as in FIG. 4) are all 0, the PUCCH resource indicated by the PRI in the last DCI is taken as a valid PUCCH resource in this case, and HARQ-ACKs corresponding to the PDSCHs corresponding to the received DCI are multiplexed together as an HARQ-ACK codebook and transmitted in the valid PUCCH resource. In addition, it is to be noted that the PDSCH scheduled by the last DCI satisfies a condition that the PDSCH scheduled by the last DCI requires a certain time to decode and form corresponding HARQ-ACK information. Assuming that these require an N1+X duration, there is at least an interval of the N1+X duration between the end of the PDSCH scheduled by the last DCI and the start of the PUCCH resource indicated in the last DCI, thereby ensuring that the PDSCH scheduled by the last DCI can be decoded in time and HARQ-ACK information can be formed. N1+X may be determined based on the hardware capabilities of the UE.

Specific Embodiment 2

Similar to Specific Embodiment 1, in Specific Embodiment 2, it is also necessary to introduce a parameter in physical layer signaling, preferably to add this parameter in DCI. The parameter is used to describe whether an HARQ-ACK of a PDSCH corresponding to the current DCI (i.e., a PDSCH scheduled by the DCI) is the last HARQ-ACK in an HARQ-ACK codebook. If the HARQ-ACK of a PDSCH corresponding to the current DCI is the last HARQ-ACK in an HARQ-ACK codebook, a PUCCH resource indicated by the current DCI is a valid PUCCH resource.

With respect to a non-valid PUCCH resource for feeding back the HARQ-ACK, a valid PUCCH resource for feeding back an HARQ-ACK can replace the previous non-valid PUCCH resource, which is considered to be a PUCCH resource required to transmit the HARQ-ACK codebook (or the valid PUCCH resource replaces the previous non-valid PUCCH resource, and the HARQ-ACK scheduled to be sent by the non-valid PUCCH resource is also transmitted in the valid PUCCH resource).

If the parameter in the received current DCI indicates that the HARQ-ACK of the PDSCH corresponding to the DCI is the last HARQ-ACK in an HARQ-ACK codebook, the HARQ-ACK information of the PDSCH scheduled by the DCI received before the current DCI (also including the current DCI) is multiplexed together and transmitted in the valid PUCCH resource indicated by the current DCI. It is noted that a forward cutoff position before the current DCI starts after the last DCI corresponding to the last HARQ-ACK codebook.

For example, the parameter is 1 bit overhead, 1 bit is 1, indicating that the HARQ-ACK of the PDSCH corresponding to the DCI is the last HARQ-ACK in an HARQ-ACK codebook, and 1 bit is 0, indicating that the HARQ-ACK of the PDSCH corresponding to the DCI is not the last HARQ-ACK in an HARQ-ACK codebook.

In addition, the mode includes the following implementation. If parameter values in the DCI received by a UE are all 0 at a PUCCH resource indicated in the uplink unit (here, at an N1+X duration before the PUCCH resource indicated in the uplink unit, N1+X at least including: time when the UE processes a PDSCH and forms corresponding HARQ-ACKs), the HARQ-ACKs of the PDSCHs corresponding to the received DCI are multiplexed together as an HARQ-ACK codebook, and the PUCCH resource indicated in the last DCI in the DCI is considered as a valid PUCCH resource, and the HARQ-ACK codebook is transmitted in the valid PUCCH resource. The mode can effectively overcome the situation that when a base station schedules the PDSCH by the current DCI, whether the PDSCH is scheduled by the subsequent DCI cannot be predicted.

In addition, the parameter may also consider whether a bit value of the parameter in the DCI before and after is reversed to express whether the HARQ-ACK of the PDSCH corresponding to the corresponding DCI is the last HARQ-ACK of an HARQ-ACK codebook. For example, the HARQ-ACK of the PDSCH corresponding to the DCI where the parameter value is reversed is the last HARQ-ACK of an HARQ-ACK codebook. If parameters in the DCI received by the UE are not reversed at a PUCCH resource indicated in the uplink unit (here, at an N1+X duration before the PUCCH resource indicated in the uplink unit, N1+X at least including: time when the UE processes a PDSCH and forms corresponding HARQ-ACKs), the PUCCH resource indicated in the last DCI in the received DCI is used as a valid PUCCH resource, and the HARQ-ACKs of the PDSCH corresponding to the DCI are multiplexed together and transmitted in the valid PUCCH resource as an HARQ-ACK codebook. The mode can effectively overcome the situation that when a base station schedules the PDSCH by the current DCI, whether the PDSCH is scheduled by the subsequent DCI cannot be predicted.

An example is as shown in FIG. 4. It is assumed that four PDSCHs are scheduled by DCI, besides, K1, PRI and the parameter values are carried in the DCI, and the K1 points to the same UL slot (if the first PDSCH is in DL slot n, K1=4, the slot pointed by the K1 is slot n+K1, and the unit of the K1 is slot; K1 may also be a unit of subslot or the like, in which case it is assumed that K1 points to the same subslot and the processing mechanism is the same). In FIG. 4, there are two PUCCH resources in a pointed UL slot, and a PRI of DCI of the first PDSCH points to a first PUCCH resource in the UL slot. In this case, the parameter in the DCI of the first PDSCH is set to 0, that is, the HARQ-ACK of the PDSCH corresponding to the DCI is not the last HARQ-ACK of an HARQ-ACK codebook. In the similar DCI of the second PDSCH, K1=3, PRI=1, pointing to the same UL slot as the UL slot pointed by the DCI corresponding to the first PDSCH, and the parameter is set to 1, so that the HARQ-ACK corresponding to the second PDSCH may be confirmed to be the last HARQ-ACK of an HARQ-ACK codebook, and the PUCCH resource indicated in the DCI is a valid PUCCH resource. Thus, HARQ-ACKs of the PDSCH corresponding to the DCI received before the DCI (current included) are multiplexed together as an HARQ-ACK codebook for transmission in the valid PUCCH resource. That is, the HARQ-ACKs of the first PDSCH and the second PDSCH are multiplexed together as an HARQ-ACK codebook, and the HARQ-ACK codebook is transmitted in a PUCCH resource indicated by the DCI of the second PDSCH. K1=2 and PRI=0 in the DCI corresponding to the third PDSCH. In this case, the parameter is set to 0. K1=1 and PRI=0 in the DCI corresponding to the fourth PDSCH. In this case, the parameter is set to 1. Thus, the HARQ-ACK corresponding to the fourth PDSCH is the last HARQ-ACK of an HARQ-ACK codebook, and the PUCCH resource indicated in the DCI is a valid PUCCH resource. Thus, HARQ-ACKs of PDSCHs corresponding to the DCI received before the DCI (included) corresponding to the fourth PDSCH are multiplexed together as an HARQ-ACK codebook for transmission in the valid PUCCH resource. The HARQ-ACK codebook actually includes HARQ-ACKs of the third PDSCH and the fourth PDSCH (the reason why there are no HARQ-ACKs of the first and second PDSCHs is that the HARQ-ACKs of the first and second PDSCHs have been already transmitted in the valid PUCCH resource indicated by the DCI of the second PDSCH as an HARQ-ACK, the transmission starting with the DCI after the last DCI in the previous HARQ-ACK codebook, i.e. the DCI of the third PDSCH, until the current DCI is selected), which are multiplexed together as an HARQ-ACK codebook and transmitted in a PUCCH resource indicated by the DCI of the fourth PDSCH.

There is also another special case. For example, if the parameter values in the DCI of the first, second, third and fourth PDSCHs (assuming that K1 points to the same slot, as in FIG. 4) are all 0, the PUCCH resource indicated by the PRI in the last DCI is taken as a valid PUCCH resource in this case, and HARQ-ACKs corresponding to the PDSCHs corresponding to the received DCI are multiplexed together and transmitted in the valid PUCCH resource. In addition, it is to be noted that the PDSCH scheduled by the last DCI satisfies a condition that the PDSCH scheduled by the last DCI requires a certain time to decode and form corresponding HARQ-ACK information. Assuming that these require an N1+X duration, there is at least an interval of the N1+X duration between the end of the PDSCH scheduled by the last DCI and the start of the PUCCH resource indicated in the last DCI, thereby ensuring that the PDSCH scheduled by the last DCI can be decoded in time and HARQ-ACK information can be formed. N1+X may be determined based on the hardware capabilities of the UE.

Specific Embodiment 3

Similar to Specific Embodiment 1, in Specific Embodiment 3, it is also necessary to introduce a parameter in physical layer signaling, preferably to add this parameter in DCI. The parameter is used to describe whether the current DCI is DCI corresponding to the last PDSCH in PDSCHs corresponding to an HARQ-ACK codebook. If the current DCI is DCI corresponding to the last PDSCH in PDSCHs corresponds to the HARQ-ACK codebook, a PUCCH resource indicated by the current DCI is a valid PUCCH resource.

With respect to a non-valid PUCCH resource for feeding back the HARQ-ACK, a valid PUCCH resource for feeding back an HARQ-ACK can replace the previous non-valid PUCCH resource, which is considered to be a PUCCH resource required to transmit the HARQ-ACK codebook (or the valid PUCCH resource replaces the previous non-valid PUCCH resource, and the HARQ-ACK scheduled to be sent by the non-valid PUCCH resource is also transmitted in the valid PUCCH resource).

If the parameter in the received current DCI indicates that the HARQ-ACK of the PDSCH corresponding to the DCI is the last HARQ-ACK in an HARQ-ACK codebook, the HARQ-ACK information of the PDSCH scheduled by the DCI received before the current DCI (also including the current DCI) is multiplexed together and transmitted in the valid PUCCH resource indicated by the current DCI. It is noted that a forward cutoff position before the current DCI starts after the last DCI corresponding to the last HARQ-ACK codebook.

For example, the parameter is 1 bit overhead, 1 bit is 1, indicating that the DCI is DCI corresponding to the last PDSCH in PDSCHs corresponding to an HARQ-ACK codebook, and 1 bit is 0, indicating that the DCI is not DCI corresponding to the last PDSCH in PDSCHs corresponding to an HARQ-ACK codebook.

In addition, the mode includes the following implementation. If parameter values in the DCI received by a UE are all 0 at a PUCCH resource indicated in the uplink unit (here, at an N1+X duration before the PUCCH resource indicated in the uplink unit, N1+X at least including: time when the UE processes a PDSCH and forms corresponding HARQ-ACKs), the HARQ-ACKs of the PDSCHs corresponding to the received DCI are multiplexed together as an HARQ-ACK codebook, and the PUCCH resource indicated in the last DCI in the DCI is considered as a valid PUCCH resource, and the HARQ-ACK codebook is transmitted in the valid PUCCH resource. The mode can effectively overcome the situation that when a base station schedules the PDSCH by the current DCI, whether the PDSCH is scheduled by the subsequent DCI cannot be predicted.

In addition, the parameter may also consider whether a bit value of the parameter in the DCI before and after is reversed to express whether the corresponding DCI is DCI corresponding to the last PDSCH in PDSCHs corresponding to an HARQ-ACK codebook. For example, the HARQ-ACK of the PDSCH corresponding to the DCI where the parameter value is reversed is the last HARQ-ACK of an HARQ-ACK codebook. If parameters in the DCI received by the UE are not reversed at a PUCCH resource indicated in the uplink unit (here, at an N1+X duration before the PUCCH resource indicated in the uplink unit, N1+X at least including: time when the UE processes a PDSCH and forms corresponding HARQ-ACKs), the PUCCH resource indicated in the last DCI in the received DCI is used as a valid PUCCH resource, and the HARQ-ACKs of the PDSCH corresponding to the DCI are multiplexed together and transmitted in the valid PUCCH resource as an HARQ-ACK codebook. The mode can effectively overcome the situation that when a base station schedules the PDSCH by the current DCI, whether the PDSCH is scheduled by the subsequent DCI cannot be predicted.

An example is as shown in FIG. 4. It is assumed that four PDSCHs are scheduled by DCI, besides K1, PRI and the parameter values are carried in the DCI, and the K1 points to the same UL slot (if the first PDSCH is in DL slot n, K1=4, the slot pointed by the K1 is slot n+K1, and the unit of the K1 is slot; K1 may also be a unit of subslot or the like, in which case it is assumed that K1 points to the same subslot and the processing mechanism is the same). In FIG. 4, there are two PUCCH resources in a pointed UL slot, and a PRI of DCI of the first PDSCH points to a first PUCCH resource in the UL slot. In this case, the parameter in the DCI of the first PDSCH is set to 0, that is, the DCI is DCI corresponding to the last PDSCH in PDSCHs corresponding to an HARQ-ACK codebook. In the similar DCI of the second PDSCH, K1=3, PRI=1, pointing to the same UL slot as the UL slot pointed by the DCI corresponding to the first PDSCH, and the parameter is set to 1, so that the DCI corresponding to the second PDSCH may be confirmed to be DCI corresponding to the last PDSCH in PDSCHs corresponding to an HARQ-ACK codebook, and the PUCCH resource indicated in the DCI is a valid PUCCH resource. Thus, HARQ-ACKs of the PDSCH corresponding to the DCI received before the DCI (current included) are multiplexed together as an HARQ-ACK codebook for transmission in the valid PUCCH resource. That is, the HARQ-ACKs of the first PDSCH and the second PDSCH are multiplexed together as an HARQ-ACK codebook, and the HARQ-ACK codebook is transmitted in a PUCCH resource indicated by the DCI of the second PDSCH. K1=2 and PRI=0 in the DCI corresponding to the third PDSCH. In this case, the parameter is set to 0. K1=1 and PRI=0 in the DCI corresponding to the fourth PDSCH. In this case, the parameter is set to 1. Thus, the DCI corresponding to the fourth PDSCH is DCI corresponding to the last PDSCH in PDSCHs corresponding to an HARQ-ACK codebook, and the PUCCH resource indicated in the DCI is a valid PUCCH resource. Thus, HARQ-ACKs of PDSCHs corresponding to the DCI received before the DCI (included) corresponding to the fourth PDSCH are multiplexed together as an HARQ-ACK codebook for transmission in the valid PUCCH resource. The HARQ-ACK codebook actually includes HARQ-ACKs of the third PDSCH and the fourth PDSCH (the reason why there are no HARQ-ACKs of the first and second PDSCHs is that the HARQ-ACKs of the first and second PDSCHs have been already transmitted in the valid PUCCH resource indicated by the DCI of the second PDSCH as an HARQ-ACK, the transmission starting with the DCI after the last DCI in the previous HARQ-ACK codebook, i.e. the DCI of the third PDSCH, until the current DCI is selected), which are multiplexed together as an HARQ-ACK codebook and transmitted in a PUCCH resource indicated by the DCI of the fourth PDSCH.

There is also another special case. For example, if the parameter values in the DCI of the first, second, third and fourth PDSCHs (assuming that K1 points to the same slot, as in FIG. 4) are all 0, the PUCCH resource indicated by the PRI in the last DCI is taken as a valid PUCCH resource in this case, and HARQ-ACKs corresponding to the PDSCHs corresponding to the received DCI are multiplexed together and transmitted in the valid PUCCH resource. In addition, it is to be noted that the PDSCH scheduled by the last DCI satisfies a condition that the PDSCH scheduled by the last DCI requires a certain time to decode and form corresponding HARQ-ACK information. Assuming that these require an N1+X duration, there is at least an interval of the N1+X duration between the end of the PDSCH scheduled by the last DCI and the start of the PUCCH resource indicated in the last DCI, thereby ensuring that the PDSCH scheduled by the last DCI can be decoded in time and HARQ-ACK information can be formed. N1+X may be determined based on the hardware capabilities of the UE.

Specific Embodiment 4

Similar to Specific Embodiment 1, in Specific Embodiment 4, it is also necessary to introduce a parameter in physical layer signaling, preferably to add this parameter in DCI. The parameter is used to describe that an ACK/NACK of a PDSCH corresponding to DCI received before is fed back in an HARQ-ACK codebook until an ACK/NACK of a PDSCH corresponding to DCI received currently (included). And a PUCCH resource indicated by the current DCI is a valid PUCCH resource.

With respect to a non-valid PUCCH resource for feeding back the HARQ-ACK, a valid PUCCH resource for feeding back an HARQ-ACK can replace the previous non-valid PUCCH resource, which is considered to be a PUCCH resource required to transmit the HARQ-ACK codebook (or the valid PUCCH resource replaces the previous non-valid PUCCH resource, and the HARQ-ACK scheduled to be sent by the non-valid PUCCH resource is also transmitted in the valid PUCCH resource).

If the parameter in the received current DCI indicates that an ACK/NACK of a PDSCH corresponding to DCI received before is fed back in an HARQ-ACK codebook until an ACK/NACK of a PDSCH corresponding to DCI received currently (included), the HARQ-ACK information of the PDSCH scheduled by the DCI received before the current DCI (also including the current DCI) is multiplexed together and transmitted in the valid PUCCH resource indicated by the current DCI. It is noted that a forward cutoff position before the current DCI starts after the last DCI corresponding to the last HARQ-ACK codebook.

For example, the parameter is 1 bit overhead, 1 bit is 1, indicating that the HARQ-ACK of the PDSCH corresponding to the DCI is the last HARQ-ACK in an HARQ-ACK codebook, and 1 bit is 0, indicating that the HARQ-ACK of the PDSCH corresponding to the DCI is not the last HARQ-ACK in an HARQ-ACK codebook.

In addition, the mode includes the following implementation. If parameter values in the DCI received by a UE are all 0 at a PUCCH resource indicated in the uplink unit (here, at an N1+X duration before the PUCCH resource indicated in the uplink unit, N1+X at least including: time when the UE processes a PDSCH and forms corresponding HARQ-ACKs), the HARQ-ACKs of the PDSCHs corresponding to the received DCI are multiplexed together as an HARQ-ACK codebook, and the PUCCH resource indicated in the last DCI in the DCI is considered as a valid PUCCH resource, and the HARQ-ACK codebook is transmitted in the valid PUCCH resource. The mode can effectively overcome the situation that when a base station schedules the PDSCH by the current DCI, whether the PDSCH is scheduled by the subsequent DCI cannot be predicted.

In addition, the parameter may also consider whether a bit value of the parameter in the DCI before and after is reversed to express whether an ACK/NACK of a PDSCH corresponding to DCI received before is fed back in an HARQ-ACK codebook until an ACK/NACK of a PDSCH corresponding to DCI received currently (included). For example, the DCI where the parameter value is reversed is that an ACK/NACK of a PDSCH corresponding to DCI received before is fed back in an HARQ-ACK codebook until an ACK/NACK of a PDSCH corresponding to DCI received currently (included) If parameters in the DCI received by the UE are not reversed at a PUCCH resource indicated in the uplink unit (here, at an N1+X duration before the PUCCH resource indicated in the uplink unit, N1+X at least including: time when the UE processes a PDSCH and forms corresponding HARQ-ACKs), the PUCCH resource indicated in the last DCI in the received DCI is used as a valid PUCCH resource, and the HARQ-ACKs of the PDSCH corresponding to the DCI are multiplexed together and transmitted in the valid PUCCH resource as an HARQ-ACK codebook. The mode can effectively overcome the situation that when a base station schedules the PDSCH by the current DCI, whether the PDSCH is scheduled by the subsequent DCI cannot be predicted.

An example is as shown in FIG. 4. It is assumed that four PDSCHs are scheduled by DCI, besides K1, PRI and the parameter values are carried in the DCI, and the K1 points to the same UL slot (if the first PDSCH is in DL slot n, K1=4, the slot pointed by the K1 is slot n+K1, and the unit of the K1 is slot; K1 may also be a unit of subslot or the like, in which case it is assumed that K1 points to the same subslot and the processing mechanism is the same). In FIG. 4, there are two PUCCH resources in a pointed UL slot, and a PRI of DCI of the first PDSCH points to a first PUCCH resource in the UL slot. In this case, the parameter in the DCI of the first PDSCH is set to 0, that is, an ACK/NACK of a PDSCH corresponding to DCI received before is fed back in an HARQ-ACK codebook until an ACK/NACK of a PDSCH corresponding to DCI received currently (included). In the similar DCI of the second PDSCH, K1=3, PRI=1, pointing to the same UL slot as the UL slot pointed by the DCI corresponding to the first PDSCH, and the parameter is set to 1, so that the DCI corresponding to the second PDSCH may be confirmed to be that an ACK/NACK of a PDSCH corresponding to DCI received before is fed back in an HARQ-ACK codebook until an ACK/NACK of a PDSCH corresponding to DCI received currently (included), and the PUCCH resource indicated in the DCI is a valid PUCCH resource. Thus, HARQ-ACKs of the PDSCH corresponding to the DCI received before the DCI (current included) are multiplexed together as an HARQ-ACK codebook for transmission in the valid PUCCH resource. That is, the HARQ-ACKs of the first PDSCH and the second PDSCH are multiplexed together as an HARQ-ACK codebook, and the HARQ-ACK codebook is transmitted in a PUCCH resource indicated by the DCI of the second PDSCH. K1=2 and PRI=0 in the DCI corresponding to the third PDSCH. In this case, the parameter is set to 0. K1=1 and PRI=0 in the DCI corresponding to the fourth PDSCH. In this case, the parameter is set to 1. Thus, the DCI corresponding to the fourth PDSCH is that an ACK/NACK of a PDSCH corresponding to DCI received before is fed back in an HARQ-ACK codebook until an ACK/NACK of a PDSCH corresponding to DCI received currently (included), and the PUCCH resource indicated in the DCI is a valid PUCCH resource. Thus, HARQ-ACKs of PDSCHs corresponding to the DCI received before the DCI (included) corresponding to the fourth PDSCH are multiplexed together as an HARQ-ACK codebook for transmission in the valid PUCCH resource. The HARQ-ACK codebook actually includes HARQ-ACKs of the third PDSCH and the fourth PDSCH (the reason why there are no HARQ-ACKs of the first and second PDSCHs is that the HARQ-ACKs of the first and second PDSCHs have been already transmitted in the valid PUCCH resource indicated by the DCI of the second PDSCH as an HARQ-ACK, the transmission starting with the DCI after the last DCI in the previous HARQ-ACK codebook, i.e. the DCI of the third PDSCH, until the current DCI is selected), which are multiplexed together as an HARQ-ACK codebook and transmitted in a PUCCH resource indicated by the DCI of the fourth PDSCH.

There is also another special case. For example, if the parameter values in the DCI of the first, second, third and fourth PDSCHs (assuming that K1 points to the same slot, as in FIG. 4) are all 0, the PUCCH resource indicated by the PRI in the last DCI is taken as a valid PUCCH resource in this case, and HARQ-ACKs corresponding to the PDSCHs corresponding to the received DCI are multiplexed together and transmitted in the valid PUCCH resource. In addition, it is to be noted that the PDSCH scheduled by the last DCI satisfies a condition that the PDSCH scheduled by the last DCI requires a certain time to decode and form corresponding HARQ-ACK information. Assuming that these require an N1+X duration, there is at least an interval of the N1+X duration between the end of the PDSCH scheduled by the last DCI and the start of the PUCCH resource indicated in the last DCI, thereby ensuring that the PDSCH scheduled by the last DCI can be decoded in time and HARQ-ACK information can be formed. N1+X may be determined based on the hardware capabilities of the UE.

Specific Embodiment 5

With respect to Specific Embodiments 1-4, an overhead-free manner is used in the present embodiment to implicitly inform the corresponding situation when the parameter value is 1 or 0 in Specific Embodiments 1-4. Different appointed CRCs in DCI are used to indicate that the parameter value is 1 or 0 in Embodiments 1-4, respectively. For example, CRC_1 and CRC_2 are appointed, when the DCI is checked by a base station using CRC_1, the situation where the parameter value is 1 in Embodiments 1-4 is indicated, and when the DCI is checked by the base station using CRC_2, the situation where the parameter value is 0 in Embodiments 1-4 is indicated. A CRC bit generator polynomial corresponding to CRC_1 is the first manner, and a CRC bit generator polynomial corresponding to CRC_2 is the second manner.

That is, when the same uplink unit is indicated in one or more DCI to feed back the HARQ-ACK information of the PDSCH scheduled by the DCI, if CRC_1 is detected in the DCI, the situation where the parameter value is 1 in Embodiments 1-4 is indicated, and when CRC_2 is detected in the DCI, the situation where the parameter value is 0 in Embodiments 1-4 is indicated. Correspondingly, the same processing rules that follow the parameter value of 1 or 0 in Embodiments 1-4 are also used.

The solution of Specific Embodiment 5 avoids signaling overhead, but slightly increases the detection complexity of a UE.

In the present embodiment, when the same uplink unit is indicated in one or more DCI to feed back HARQ-ACK information of a PDSCH scheduled by the DCI, if CRC_1 is detected in the DCI, it is indicated that the PUCCH resource indicated by the DCI is a valid PUCCH resource. If CRC_2 is detected in the DCI, it is indicated that the PUCCH resource indicated by the DCI is a non-valid PUCCH resource.

With respect to a non-valid PUCCH resource for feeding back the HARQ-ACK, a valid PUCCH resource for feeding back an HARQ-ACK can replace the previous non-valid PUCCH resource, which is considered to be a PUCCH resource required to transmit the HARQ-ACK codebook (or the valid PUCCH resource replaces the previous non-valid PUCCH resource, and the HARQ-ACK scheduled to be sent by the non-valid PUCCH resource is also transmitted in the valid PUCCH resource).

If the PUCCH resource indicated by the received current DCI are marked as a valid PUCCH resource, the HARQ-ACK information of the PDSCH (also scheduled) corresponding to the DCI received before the current DCI (also including the current DCI) is multiplexed together to serve as an HARQ-ACK codebook and is sent in the PUCCH resource indicated by the current DCI. It is noted that a forward cutoff position before the current DCI starts after the last DCI corresponding to the last HARQ-ACK codebook.

If the DCI received by the UE adopts CRC_2 at a PUCCH resource indicated in the uplink unit (here, at an N1+X duration before the PUCCH resource indicated in the uplink unit, N1+X at least including: time when the UE processes a PDSCH and forms corresponding HARQ-ACKs), the PUCCH resource indicated in the last DCI in the received DCI is used as a valid PUCCH resource, and the HARQ-ACKs of the PDSCH corresponding to the DCI are multiplexed together and transmitted in the valid PUCCH resource as an HARQ-ACK codebook. The mode can effectively overcome the situation that when a base station schedules the PDSCH by the current DCI, whether the PDSCH is scheduled by the subsequent DCI cannot be predicted.

In addition, whether a CRC checking in the DCI before and after is changed may also be considered to express whether the PUCCH resource indicated by the corresponding DCI is a valid PUCCH resource. For example, the CRC adopted by the current DCI is changed with respect to the CRC adopted by the previous DCI, and then the PUCCH resource indicated in the current DCI is a valid PUCCH resource for feeding back an HARQ-ACK. If CRCs in the DCI received by the UE are not changed at a PUCCH resource indicated in the uplink unit (here, at an N1+X duration before the PUCCH resource indicated in the uplink unit, N1+X at least including: time when the UE processes a PDSCH and forms corresponding HARQ-ACKs), the PUCCH resource indicated in the last DCI in the received DCI is used as a valid PUCCH resource, and the HARQ-ACKs of the PDSCH corresponding to the DCI are multiplexed together and transmitted in the valid PUCCH resource as an HARQ-ACK codebook. The mode can effectively overcome the situation that when a base station schedules the PDSCH by the current DCI, whether the PDSCH is scheduled by the subsequent DCI cannot be predicted.

Figure 5:
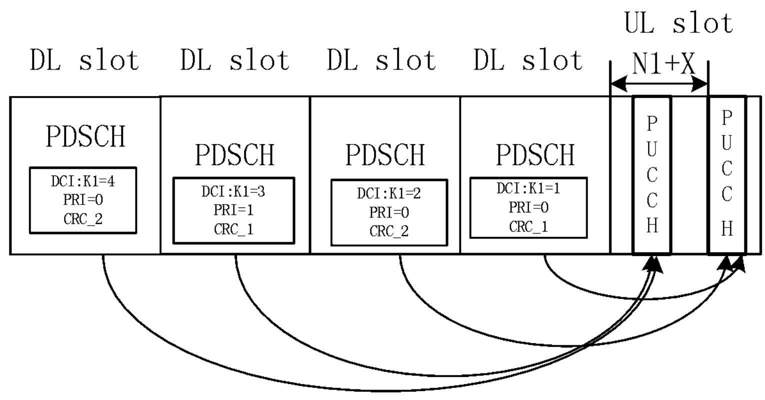
FIG. 5 is a schematic diagram of Specific Embodiment 5 according to another embodiment of the disclosure.

An example is as shown in FIG. 5. FIG. 5 is a schematic diagram of Specific Embodiment 5 according to another embodiment of the disclosure. As shown in FIG. 5, it is assumed that four PDSCHs are scheduled by DCI, besides K1, PRI and CRC are carried in the DCI, and the K1 points to the same UL slot (if the first PDSCH is in DL slot n, K1=4, the slot pointed by the K1 is slot n+K1, and the unit of the K1 is slot; K1 may also be a unit of subslot or the like, in which case it is assumed that K1 points to the same subslot and the processing mechanism is the same). In FIG. 5, there are two PUCCH resources in a pointed UL slot, and a PRI of DCI of the first PDSCH points to a first PUCCH resource in the UL slot. In this case, CRC_2 is adopted in the DCI of the first PDSCH, that is, the PUCCH resource indicated by the PRI in the DCI is a non-valid PUCCH resource. In the similar DCI of the second PDSCH, K1=3, PRI=1, pointing to the same UL slot as the UL slot pointed by the DCI corresponding to the first PDSCH, and CRC_1 is adopted, so that the PUCCH resource indicated by the DCI corresponding to the second PDSCH may be confirmed to be a valid PUCCH resource. Thus, HARQ-ACKs of the PDSCH corresponding to the DCI received before the DCI (current included) are multiplexed together as an HARQ-ACK codebook for transmission in the valid PUCCH resource. That is, the HARQ-ACKs of the first PDSCH and the second PDSCH are multiplexed together as an HARQ-ACK codebook, and the HARQ-ACK codebook is transmitted in a PUCCH resource indicated by the DCI of the second PDSCH. K1=2 and PRI=0 in the DCI corresponding to the third PDSCH. In this case, CRC_2 is adopted. K1=1 and PRI=0 in the DCI corresponding to the fourth PDSCH. In this case, CRC_1 is adopted. Thus, a valid PUCCH resource is indicated in the DCI of the fourth PDSCH. Thus, HARQ-ACKs of PDSCHs corresponding to the DCI received before the DCI (included) corresponding to the fourth PDSCH are multiplexed together as an HARQ-ACK codebook for transmission in the valid PUCCH resource. The HARQ-ACK codebook actually includes HARQ-ACKs of the third PDSCH and the fourth PDSCH (the reason why there are no HARQ-ACKs of the first and second PDSCHs is that the HARQ-ACKs of the first and second PDSCHs have been already transmitted in the valid PUCCH resource indicated by the DCI of the second PDSCH as an HARQ-ACK, the transmission starting with the DCI after the last DCI in the previous HARQ-ACK codebook, i.e. the DCI of the third PDSCH, until the current DCI is selected), which are multiplexed together as an HARQ-ACK codebook and transmitted in a PUCCH resource indicated by the DCI of the fourth PDSCH.

There is also another special case. For example, if CRC_2 is adopted in the DCI of the first, second, third and fourth PDSCHs (assuming that K1 points to the same slot, as in FIG. 4), the PUCCH resource indicated by the PRI in the last DCI is taken as a valid PUCCH resource in this case, and HARQ-ACKs corresponding to the PDSCHs corresponding to the received DCI are multiplexed together as an HARQ-ACK codebook and transmitted in the valid PUCCH resource. In addition, it is to be noted that the PDSCH scheduled by the last DCI satisfies a condition that the PDSCH scheduled by the last DCI requires a certain time to decode and form corresponding HARQ-ACK information. Assuming that these require an N1+X duration, there is at least an interval of the N1+X duration between the end of the PDSCH scheduled by the last DCI and the start of the PUCCH resource indicated in the last DCI, thereby ensuring that the PDSCH scheduled by the last DCI can be decoded in time and HARQ-ACK information can be formed. N1+X may be determined based on the hardware capabilities of the UE.

Specific Embodiment 6

With respect to Embodiments 1-4, an overhead-free manner is used in Specific Embodiment 6 to implicitly inform the corresponding situation when the parameter value is 1 or 0 in Embodiments 1-4. Different appointed RNTI scramblers in DCI are used to indicate that the parameter value is 1 or 0 in Embodiments 1-4, respectively. For example, RNTI_1 and RNTI_2 are appointed, when the DCI is scrambled by a base station using RNTI_1, the situation where the parameter value is 1 in Embodiments 1-4 is indicated, and when the DCI is scrambled by the base station using RNTI_2, the situation where the parameter value is 0 in Embodiments 1-4 is indicated.

That is, when the same uplink unit is indicated in one or more DCI to feed back the HARQ-ACK information of the PDSCH scheduled by the DCI, if RNTI_1 scrambling is detected in the DCI, the situation where the parameter value is 1 in Embodiments 1-4 is indicated, and when RNTI_2 scrambling is detected in the DCI, the situation where the parameter value is 0 in Embodiments 1-4 is indicated. Correspondingly, the same processing rules that follow the parameter value of 1 or 0 in Embodiments 1-4 are also used.

The manner of Specific Embodiment 6 avoids signaling overhead, but slightly increases the detection complexity of a UE.

In the present embodiment, when the same uplink unit is indicated in one or more DCI to feed back HARQ-ACK information of a PDSCH scheduled by the DCI, if RNTI_1 scrambling is detected in the DCI, it is indicated that the PUCCH resource indicated by the DCI is a valid PUCCH resource. If RNTI_2 scrambling is detected in the DCI, it is indicated that the PUCCH resource indicated by the DCI is a non-valid PUCCH resource.

With respect to a non-valid PUCCH resource for feeding back the HARQ-ACK, a valid PUCCH resource for feeding back an HARQ-ACK can replace the previous non-valid PUCCH resource, which is considered to be a PUCCH resource required to transmit the HARQ-ACK codebook (or the valid PUCCH resource replaces the previous non-valid PUCCH resource, and the HARQ-ACK scheduled to be sent by the non-valid PUCCH resource is also transmitted in the valid PUCCH resource).

If the PUCCH resource indicated by the received current DCI are marked as a valid PUCCH resource, the HARQ-ACK information of the PDSCH (also scheduled) corresponding to the DCI received before the current DCI (also including the current DCI) is multiplexed together to serve as an HARQ-ACK codebook and is sent in the PUCCH resource indicated by the current DCI. It is noted that a forward cutoff position before the current DCI starts after the last DCI corresponding to the last HARQ-ACK codebook.

If the DCI received by the UE adopts RNTI_2 scrambling at a PUCCH resource indicated in the uplink unit (here, at an N1+X duration before the PUCCH resource indicated in the uplink unit, N1+X at least including: time when the UE processes a PDSCH and forms corresponding HARQ-ACKs), the PUCCH resource indicated in the last DCI in the received DCI is used as a valid PUCCH resource, and the HARQ-ACKs of the PDSCH corresponding to the DCI are multiplexed together and transmitted in the valid PUCCH resource as an HARQ-ACK codebook. The mode can effectively overcome the situation that when a base station schedules the PDSCH by the current DCI, whether the PDSCH is scheduled by the subsequent DCI cannot be predicted.

In addition, whether an RNTI scrambling in the DCI before and after is changed may also be considered to express whether the PUCCH resource indicated by the corresponding DCI is a valid PUCCH resource. For example, the RNTI adopted by the current DCI is changed with respect to the RNTI adopted by the previous DCI, and then the PUCCH resource indicated in the current DCI is a valid PUCCH resource for feeding back an HARQ-ACK. If RNTIs in the DCI received by the UE are not changed at a PUCCH resource indicated in the uplink unit (here, at an N1+X duration before the PUCCH resource indicated in the uplink unit, N1+X at least including: time when the UE processes a PDSCH and forms corresponding HARQ-ACKs), the PUCCH resource indicated in the last DCI in the received DCI is used as a valid PUCCH resource, and the HARQ-ACKs of the PDSCH corresponding to the DCI are multiplexed together and transmitted in the valid PUCCH resource as an HARQ-ACK codebook. The mode can effectively overcome the situation that when a base station schedules the PDSCH by the current DCI, whether the PDSCH is scheduled by the subsequent DCI cannot be predicted.

Figure 6:
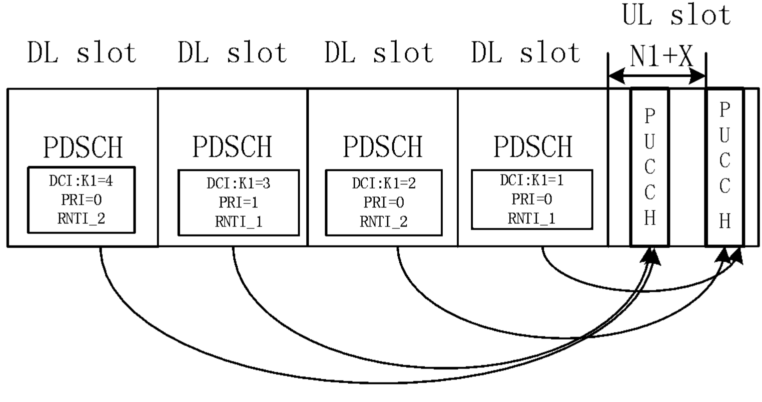
FIG. 6 is a schematic diagram of Specific Embodiment 6 according to another embodiment of the disclosure.

An example is as follows. FIG. 6 is a schematic diagram of Specific Embodiment 6 according to another embodiment of the disclosure. As shown in FIG. 6, it is assumed that four PDSCHs are scheduled by DCI, besides K1, PRI and RNTI scramblers are carried in the DCI, and the K1 points to the same UL slot (if the first PDSCH is in DL slot n, K1=4, the slot pointed by the K1 is slot n+K1, and the unit of the K1 is slot; K1 may also be a unit of subslot or the like, in which case it is assumed that K1 points to the same subslot and the processing mechanism is the same). In FIG. 6, there are two PUCCH resources in a pointed UL slot, and a PRI of DCI of the first PDSCH points to a first PUCCH resource in the UL slot. In this case, RNTI_2 scrambling is adopted in the DCI of the first PDSCH, that is, the PUCCH resource indicated by the PRI in the DCI is a non-valid PUCCH resource. In the similar DCI of the second PDSCH, K1=3, PRI=1, pointing to the same UL slot as the UL slot pointed by the DCI corresponding to the first PDSCH, and RNTI_1 scrambling is adopted, so that the PUCCH resource indicated by the DCI corresponding to the second PDSCH may be confirmed to be a valid PUCCH resource. Thus, HARQ-ACKs of the PDSCH corresponding to the DCI received before the DCI (current included) are multiplexed together as an HARQ-ACK codebook for transmission in the valid PUCCH resource. That is, the HARQ-ACKs of the first PDSCH and the second PDSCH are multiplexed together as an HARQ-ACK codebook, and the HARQ-ACK codebook is transmitted in a PUCCH resource indicated by the DCI of the second PDSCH. K1=2 and PRI=0 in the DCI corresponding to the third PDSCH. In this case, RNTI_2 scrambling is adopted. K1=1 and PRI=0 in the DCI corresponding to the fourth PDSCH. In this case, CRC_1 scrambling is adopted. Thus, a valid PUCCH resource is indicated in the DCI of the fourth PDSCH. Thus, HARQ-ACKs of PDSCHs corresponding to the DCI received before the DCI (included) corresponding to the fourth PDSCH are multiplexed together as an HARQ-ACK codebook for transmission in the valid PUCCH resource. The HARQ-ACK codebook actually includes HARQ-ACKs of the third PDSCH and the fourth PDSCH (the reason why there are no HARQ-ACKs of the first and second PDSCHs is that the HARQ-ACKs of the first and second PDSCHs have been already transmitted in the valid PUCCH resource indicated by the DCI of the second PDSCH as an HARQ-ACK, the transmission starting with the DCI after the last DCI in the previous HARQ-ACK codebook, i.e. the DCI of the third PDSCH, until the current DCI is selected), which are multiplexed together as an HARQ-ACK codebook and transmitted in a PUCCH resource indicated by the DCI of the fourth PDSCH.

There is also another special case. For example, if RNTI_2 scrambling is adopted in the DCI of the first, second, third and fourth PDSCHs (assuming that K1 points to the same slot, as in FIG. 4), the PUCCH resource indicated by the PRI in the last DCI is taken as a valid PUCCH resource in this case, and HARQ-ACKs corresponding to the PDSCHs corresponding to the received DCI are multiplexed together as an HARQ-ACK codebook and transmitted in the valid PUCCH resource. In addition, it is to be noted that the PDSCH scheduled by the last DCI satisfies a condition that the PDSCH scheduled by the last DCI requires a certain time to decode and form corresponding HARQ-ACK information. Assuming that these require an N1+X duration, there is at least an interval of the N1+X duration between the end of the PDSCH scheduled by the last DCI and the start of the PUCCH resource indicated in the last DCI, thereby ensuring that the PDSCH scheduled by the last DCI can be decoded in time and HARQ-ACK information can be formed. N1+X may be determined based on the hardware capabilities of the UE.

Specific Embodiment 7

With respect to Embodiments 1-4, the solution of Specific Embodiment 7 is that a manner of multiplexing other parameters is used in the present embodiment to implicitly inform the corresponding situation when the parameter value is 1 or 0 in Embodiments 1-4. A PRI parameter of the related art is multiplexed and added with a new meaning. A PRI means in the related art to indicate a PUCCH resource (the PUCCH may not be a valid PUCCH resource). Here, additionally, when multiple PRI values are the same, the PUCCH resource indicated by the last PRI is a valid PUCCH resource.

When the same uplink unit is indicated in one or more DCI to feed back the HARQ-ACK information of the PDSCH scheduled by the DCI, the HARQ-ACKs of the corresponding PDSCH of the DCI with the same PRI value in the DCI are multiplexed together as an HARQ-ACK codebook, and the HARQ-ACK codebook is transmitted in the PUCCH indicated by the PRI in the last DCI in the DCI with the same PRI value. That is, the PUCCH resource indicated by the PRI in the last DCI of the DCI with the same PRI value is a valid PUCCH resource.

It is noted that according to the related art, a corresponding PUCCH set is determined according to the number of UCI bits to be transmitted, and then the PUCCH resource indicated by the PRI is selected from the determined PUCCH set according to the PRI. The UE may have at most four PUCCH sets, each PUCCH set corresponding to UCI transmitting a given bit number range. For example, the UE may have two PUCCH sets, PUCCH resources in PUCCH set 0 may only transmit 1-2 bits of UCI, and PUCCH resources in PUCCH set 1 may only transmit more than 2 bits of UCI. Therefore, PUCCH resources with the same PRI value actually come from different PUCCH sets and are different PUCCH resources.

That is, if the base station needs to multiplex HARQ-ACKs of multiple PDSCHs together as an HARQ-ACK codebook and transmit in a PUCCH resource, the base station sets PRIs with the same value in the DCI of the multiple PDSCHs, and transmits the HARQ-ACK codebook using PUCCH resources indicated by PRIs in the last DCI in the DCI of the multiple PDSCHs in agreement with the UE.

Figure 7:
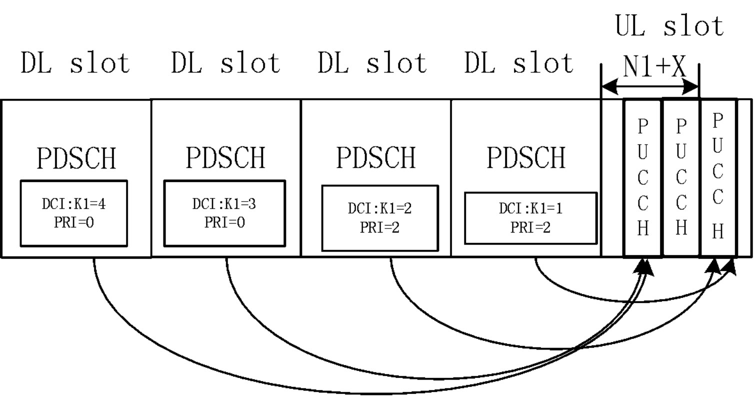
FIG. 7 is a schematic diagram of Specific Embodiment 7 according to another embodiment of the disclosure.

An example is as shown in FIG. 7. FIG. 7 is a schematic diagram of Specific Embodiment 7 according to another embodiment of the disclosure. As shown in FIG. 7, in DCI corresponding to first and second PDSCHs, the base station sets PRIs in the corresponding DCI to 0, and in DCI corresponding to third and fourth PDSCHs, the base station sets PRIs in the corresponding DCI to 2. Thus, the HARQ-ACKs of the two PDSCHs with the PRI of 0 are multiplexed together and transmitted as an HARQ-ACK codebook in the PUCCH resource indicated by the PRI in the DCI corresponding to the second PDSCH. The HARQ-ACKs of the two PDSCHs with the PRI of 2 are multiplexed together and transmitted as an HARQ-ACK codebook in the PUCCH resource indicated by the PRI in the DCI corresponding to the fourth PDSCH.

There is also another special case. For example, if the PRI values in the DCI of the first, second, third and fourth PDSCHs are the same, the PUCCH resource indicated by the PRI in the last DCI is taken as a valid PUCCH resource in this case, and HARQ-ACKs corresponding to the PDSCHs corresponding to the received DCI are multiplexed together as an HARQ-ACK codebook and transmitted in the valid PUCCH resource. In addition, it is to be noted that the PDSCH scheduled by the last DCI satisfies a condition that the PDSCH scheduled by the last DCI requires a certain time to decode and form corresponding HARQ-ACK information. Assuming that these require an N1+X duration, there is at least an interval of the N1+X duration between the end of the PDSCH scheduled by the last DCI and the start of the PUCCH resource indicated in the last DCI, thereby ensuring that the PDSCH scheduled by the last DCI can be decoded in time and HARQ-ACK information can be formed. N1+X may be determined based on the hardware capabilities of the UE.

Specific Embodiment 8

With respect to Specific Embodiments 1-4, a manner of multiplexing other parameters is used in the present embodiment to implicitly inform the corresponding situation when the parameter value is 1 or 0 in Embodiments 1-4. A PRI parameter of the related art is multiplexed and added with a new meaning. The PRI has 3-bit overhead in the related art and constitutes eight states. One state is appointed to represent the meaning of the parameter of 0 in Embodiments 1-4, the PUCCH resource indicated by the PRI is invalid in this case, the remaining states represent the meaning of the parameter of 1 in Embodiments 1-4, and the PUCCH resource indicated by the PRI is valid. For example, the appointment “000” in the PRI value represents the meaning of the parameter of 0 in Embodiments 1-4, and the remaining values represent the meaning of the parameter of 1 in Embodiments 1-4. The remaining operations are the same as those described in Embodiments 1-4 where the parameter value is 1 or 0. In the following, Embodiment 1 is repeated as an example, and the remaining embodiments are not repeated.

When the same uplink unit is indicated in one or more DCI to feed back HARQ-ACK information of a PDSCH scheduled by the DCI, the PRI parameter in the DCI is utilized to indicate that the PUCCH resource indicated in the DCI is a valid PUCCH resource. For example, it is assumed that “000” is used to represent the situation where the parameter value is 0 in Modes 1-4, and other states represent the situation where the parameter value is 1 in Modes 1-4.

That is, if the base station needs to multiplex HARQ-ACKs of multiple PDSCHs together as an HARQ-ACK codebook and transmit in a PUCCH resource, the base station sets a PRI value to be in state ‘000’ in the last DCI of the DCI of the multiple PDSCHs to represent that the PUCCH resource indicated by the DCI is a valid PUCCH resource. The PRI is set to “000” in the non-last DCI in the DCI of the PDSCHs.

For example, if the PRI value in the current DCI is “101”, the PUCCH resource indicated in the current DCI is a valid PUCCH resource for feeding back an HARQ-ACK. If parameter values in the DCI received by a UE are all 000 at a PUCCH resource indicated in the uplink unit (here, at an N1+X duration before the PUCCH resource indicated in the uplink unit, N1+X at least including: time when the UE processes a PDSCH and forms corresponding HARQ-ACKs), the PRI value in all DCI received by the UE is “000”, and then the PUCCH resource indicated by the PRI in the last DCI in the received DCI is used as a valid PUCCH resource (in this case, the PRI value is “000”, but the valid PUCCH resource is indicated). The mode can effectively overcome the situation that when a base station schedules the PDSCH by the current DCI, whether the PDSCH is scheduled by the subsequent DCI cannot be predicted.

By adopting the solution, the determination of a semi-static codebook during punching transmission is effectively solved, and the overhead is moderate.

Through the description of the above implementation manners, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the disclosure, which is essential or contributes to the related art, may be embodied in the form of a software product stored in a storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various embodiments of the disclosure.

In the embodiments of the disclosure, an information transmission apparatus is also provided. The apparatus is used to implement the above embodiments and preferred implementation manners, and those have not been described will not be elaborated. As used below, the term "module" may implement a combination of software and/or hardware of a predetermined function. Although the apparatus described in the following embodiments is preferably implemented in software, hardware, or a combination of software and hardware, is also possible and contemplated.

According to another embodiment of the disclosure, an information transmission apparatus is also provided, which includes:

- a first receiving module, configured to receive physical layer signaling corresponding to a PDSCH, wherein the physical layer signaling carries a first parameter; and
- a first transmission module, configured to transmit, according to an indication of the first parameter, an HARQ-ACK corresponding to the PDSCH.

According to another embodiment of the disclosure, an information transmission apparatus is also provided, which includes:

- a second receiving module, configured to receive DCI corresponding to a PDSCH, wherein the DCI supports different CRC bit generator polynomials or supports scrambling based on different RNTI sequence; and
- a second transmission module, configured to transmit an HARQ-ACK corresponding to the PDSCH according to an indication of the CRC bit generator polynomials or scrambling based on the RNTI sequence of the DCI.

According to another embodiment of the disclosure, an information transmission apparatus is also provided, which includes:

- a third receiving module, configured to receive DCI corresponding to a PDSCH, wherein the DCI includes a PRI; and
- a third transmission module, configured to transmit an HARQ-ACK corresponding to the PDSCH according to a value of the PRI.

According to another embodiment of the disclosure, an information transmission apparatus is also provided, which includes:

- a fourth transmission module, configured to transmit physical layer signaling to a second communication node in a PDSCH, wherein the physical layer signaling carries a first parameter for indicating the second communication node to select a first type of PUCCH, and the first type of PUCCH is used for transmitting an HARQ-ACK corresponding to the PDSCH.

According to another embodiment of the disclosure, an information transmission apparatus is also provided, which includes:

- a fifth transmission module, configured to transmit DCI to a second communication node in a PDSCH, wherein the DCI supports different CRC bit generator polynomials or different RNTI sequence scramblers, the CRC bit generator polynomials or the RNTI sequence scramblers of the DCI is used for indicating the second communication node to select a first type of PUCCH, and the first type of PUCCH is used for transmitting an HARQ-ACK corresponding to the PDSCH.

According to another embodiment of the disclosure, an information transmission apparatus is also provided, which includes:

- a sixth transmission module, configured to transmit DCI to a second communication node in a PDSCH, wherein a value of a PRI of the DCI is used for indicating the second communication node to select a first type of PUCCH, and the first type of PUCCH is used for transmitting an HARQ-ACK corresponding to the PDSCH.

It is to be noted that each of the above modules may be implemented by software or hardware. For the latter, it may be implemented by, but not limited to, the following manners that the above modules are all located in the same processor; or, the above modules are located in different processors in any combination form respectively.

The embodiment of the disclosure also provides a storage medium. Optionally, in the present embodiment, the storage medium may be configured to store a program code for performing the following operations.

In S1, physical layer signaling corresponding to a PDSCH is received, wherein the physical layer signaling carries a first parameter.

In S2, an HARQ-ACK corresponding to the PDSCH is transmitted according to an indication of the first parameter.

Optionally, in the present embodiment, the storage medium may include, but is not limited to, various media capable of storing a program code such as a U disk, a Read-Only Memory (ROM), a Random Access Memory (RAM), a mobile hard disk, a magnetic disk or an optical disc.

The embodiment of the disclosure also provides an electronic device. The electronic device includes a memory and a processor. The memory stores a computer program. The processor is configured to run the computer program to perform the operations in any one of the above method embodiments.

Optionally, the electronic device may further include a transmission apparatus and an input-output device. The transmission apparatus is connected to the processor, and the input-output device is connected to the processor.

Optionally, in the present embodiment, the processor may be configured to use the computer program to perform the following operations.

In S1, physical layer signaling corresponding to a PDSCH is received, wherein the physical layer signaling carries a first parameter.

In S2, an HARQ-ACK corresponding to the PDSCH is transmitted according to an indication of the first parameter.

Optionally, a specific example in the present embodiment may refer to the examples described in the above embodiments and alternative implementation manners, and details are not described herein in the present embodiment.

Optionally, a specific example in the present embodiment may refer to the examples described in the above embodiments and alternative implementation manners, and details are not described herein in the present embodiment.

It is apparent that a person skilled in the art shall understand that all of the above-mentioned modules or operations in the disclosure may be implemented by using a general calculation apparatus, may be centralized on a single calculation apparatus or may be distributed on a network composed of multiple calculation apparatuses. Optionally, they may be implemented by using executable program codes of the calculation apparatuses. Thus, they may be stored in a storage apparatus and executed by the calculation apparatuses, the shown or described operations may be executed in a sequence different from this sequence under certain conditions, or they are manufactured into each integrated circuit module respectively, or multiple modules or operations therein are manufactured into a single integrated circuit module. Thus, the disclosure is not limited to the combination of any specific hardware and software.

The above is only the preferred embodiments of the disclosure, not intended to limit the disclosure. As will occur to those skilled in the art, the disclosure is susceptible to various modifications and changes. Any modifications, equivalent replacements, improvements and the like made within the spirit and principle of the disclosure shall fall within the scope of protection of the disclosure.

INDUSTRIAL APPLICABILITY

As described above, the information transmission method and apparatus provided by the embodiment of the disclosure have the following beneficial effects: the problem of greater delay for HARQ-ACK feedback in the related art is solved, and the low delay processing of a service is ensured.

What claimed is:

1. An information transmission method, comprising:

transmitting Downlink Control Information (DCI) corresponding to a Physical Downlink Shared Channel (PDSCH) to a second communication node, wherein the DCI carries a first parameter, k1 and Physical Resource Indicator (PRI); and receiving, according to an indication of the first parameter, a Hybrid Automatic Repeat Request Acknowledgment (HARQ-ACK) corresponding to the PDSCH;

wherein receiving, according to the indication of the first parameter, the HARQ-ACK corresponding to the PDSCH comprises:

transmitting DCIs scheduling one or more PDSCHs, indicating one uplink unit for receiving the HARQ-ACK corresponding to the one or more PDSCHs according to the kl carried in the DCIs, and indicating which of the HARQ-ACKs of the one or more PDSCHs belong to one HARQ-ACK codebook according to the indication of the first parameter carried in the DCIs and indicating a PUCCH resource corresponding to the HARQ-ACK codebook according to the PRI carried in the DCIs;

wherein the first parameter is used for indicating a HARQ-ACK codebook to which a HARQ-ACK corresponding to a PDSCH belongs;

wherein the k1 is used for indicating a uplink unit for receiving a HARQ-ACK corresponding to a PDSCH, comprising: in a case where the PDSCH is transmitted in a unit n, the HARQ-ACK corresponding to the PDSCH is received in a unit n+k1;

wherein the PRI is used for indicating a PUCCH resource corresponding to a HARQ-ACK corresponding to a PDSCH;

wherein a PUCCH resource corresponding to a HARQ-ACK codebook is determined according to the indication of the PRI in the last DCI corresponding to the HARQ-ACK codebook.

2. The method according to claim 1, wherein receiving, according to the indication of the first parameter, the HARQ-ACK corresponding to the PDSCH comprises:

transmitting DCIs scheduling one or more PDSCHs, indicating at least one of the following information according to the first parameter carried in the DCIs: a Physical Uplink Control Channel (PUCCH) corresponding to a HARQ-ACK codebook in an uplink unit; and a corresponding PUCCH of each HARQ-ACK corresponding to the PDSCH in an uplink unit; and receiving the HARQ-ACK corresponding to the PDSCH or receiving the HARQ-ACK codebook on the PUCCH.

3. The method according to claim 1, wherein the first parameter is used for indicating at least one of the following information:

when the first parameter is a first numerical value, the first parameter is used for indicating that a PUCCH indicated by corresponding DCI is a first type of PUCCH, and when the first parameter is a second numerical value, the first parameter is used for indicating that a PUCCH indicated by corresponding DCI is a non-first type of PUCCH;

when the first parameter is a first numerical value, the first parameter is used for indicating that a HARQ-ACK of a PDSCH corresponding to corresponding DCI is the last HARQ-ACK of a HARQ-ACK codebook, and when the first parameter is a second numerical value, the first parameter is used for indicating that a HARQ-ACK of a PDSCH corresponding to corresponding DCI is not the last HARQ-ACK of a HARQ-ACK codebook, wherein the HARQ-ACK codebook is received on a PUCCH indicated by the last DCI in the DCI corresponding to the HARQ-ACK codebook;

when the first parameter is a first numerical value, the first parameter is used for indicating that corresponding DCI is DCI of the last PDSCH in a PDSCH corresponding to a HARQ-ACK codebook, and when the first parameter is a second numerical value, the first parameter is used for indicating that corresponding DCI is not DCI of the last PDSCH in a PDSCH corresponding to a HARQ-ACK codebook, wherein the HARQ-ACK codebook is received on a PUCCH indicated by the last DCI in the DCI corresponding to the HARQ-ACK codebook;

when the first parameter is a first numerical value, the first parameter is used for indicating that one or more HARQ-ACKs to be received prior to a HARQ-ACK of a PDSCH corresponding to current DCI is fed back in a HARQ-ACK codebook, the HARQ-ACK codebook is received on the PUCCH indicated by the DCI transmitted currently; and in response to the current DCI scheduling the PDSCH, the HARQ-ACK of the PDSCH scheduled by the current DCI is multiplexed with the one or more HARQ-ACKs to be received previously in one HARQ-ACK codebook, and the HARQ-ACK codebook is received on the PUCCH resource indicated by the current DCI.

4. The method according to claim 1, wherein receiving, according to the indication of the first parameter, the HARQ-ACK corresponding to the PDSCH comprises:

transmitting DCIs scheduling one or more PDSCHs, indicating the second communication node selecting a Physical Uplink Control Channel (PUCCH) indicated by DCI with a first parameter which is a first numerical value as a second type of PUCCH; and receiving a HARQ-ACK codebook in the second type of PUCCH, wherein the HARQ-ACK codebook comprises one or more HARQ-ACKs, and the HARQ-ACK codebook comprises all HARQ-ACKs to be received between a current second type of PUCCH and a previous second type of PUCCH.

5. An electronic device, wherein the electronic device stores a computer program, wherein the computer program, when executed by a processor, implements the method according to claim 1.

6. The electronic device according to claim 5, wherein receiving, according to the indication of the first parameter, the HARQ-ACK corresponding to the PDSCH comprises:

transmitting DCIs scheduling one or more PDSCHs, indicating at least one of the following information according to the first parameter carried in the DCIs: a Physical Uplink Control Channel (PUCCH) corresponding to a HARQ-ACK codebook in an uplink unit; and a corresponding PUCCH of each HARQ-ACK corresponding to the PDSCH in an uplink unit; and receiving the HARQ-ACK corresponding to the PDSCH or receiving the HARQ-ACK codebook on the PUCCH.

7. The electronic device according to claim 5, wherein the first parameter is used for indicating at least one of the following information:

when the first parameter is a first numerical value, the first parameter is used for indicating that a PUCCH indicated by corresponding DCI is a first type of PUCCH, and when the first parameter is a second numerical value, the first parameter is used for indicating that a PUCCH indicated by corresponding DCI is a non-first type of PUCCH;

when the first parameter is a first numerical value, the first parameter is used for indicating that a HARQ-ACK of a PDSCH corresponding to corresponding DCI is the last HARQ-ACK of a HARQ-ACK codebook, and when the first parameter is a second numerical value, the first parameter is used for indicating that a HARQ-ACK of a PDSCH corresponding to corresponding DCI is not the last HARQ-ACK of a HARQ-ACK codebook, wherein the HARQ-ACK codebook is received on a PUCCH indicated by the last DCI in the DCI corresponding to the HARQ-ACK codebook;

when the first parameter is a first numerical value, the first parameter is used for indicating that corresponding DCI is DCI of the last PDSCH in a PDSCH corresponding to a HARQ-ACK codebook, and when the first parameter is a second numerical value, the first parameter is used for indicating that corresponding DCI is not DCI of the last PDSCH in a PDSCH corresponding to a HARQ-ACK codebook, wherein the HARQ-ACK codebook is received on a PUCCH indicated by the last DCI in the DCI corresponding to the HARQ-ACK codebook;

when the first parameter is a first numerical value, the first parameter is used for indicating that one or more HARQ-ACKs to be received prior to a HARQ-ACK of a PDSCH corresponding to current DCI is fed back in a HARQ-ACK codebook, the HARQ-ACK codebook is received on the PUCCH indicated by the DCI transmitted currently; and in response to the current DCI scheduling the PDSCH, the HARQ-ACK of the PDSCH scheduled by the current DCI is multiplexed with the one or more HARQ-ACKs to be received previously in one HARQ-ACK codebook, and the HARQ-ACK codebook is received on the PUCCH resource indicated by the current DCI.

8. The electronic device according to claim 5, wherein receiving, according to the indication of the first parameter, the HARQ-ACK corresponding to the PDSCH comprises:

transmitting DCIs scheduling one or more PDSCHs, indicating the second communication node selecting a Physical Uplink Control Channel (PUCCH) indicated by DCI with a first parameter which is a first numerical value as a second type of PUCCH; and receiving a HARQ-ACK codebook in the second type of PUCCH, wherein the HARQ-ACK codebook comprises one or more HARQ-ACKs, and the HARQ-ACK codebook comprises all HARQ-ACKs to be received between a current second type of PUCCH and a previous second type of PUCCH.

9. An information transmission method, comprising:

receiving Downlink Control Information (DCI) corresponding to a Physical Downlink Shared Channel (PDSCH), wherein the DCI carries a first parameter, k1 and Physical Resource Indicator (PRI), for indicating selecting a first type of Physical Uplink Control Channel (PUCCH), and the first type of PUCCH is used for receiving a Hybrid Automatic Repeat Request Acknowledgment (HARQ-ACK) corresponding to the PDSCH;

transmitting the HARQ-ACK corresponding to the PDSCH according to the indication of the first parameter;

wherein transmitting the HARQ-ACK corresponding to the PDSCH according to the indication of the first parameter, comprises:

receiving DCIs scheduling one or more PDSCHs, acquiring one uplink unit for transmitting the HARQ-ACK corresponding to the one or more PDSCHs according to the kl carried in the DCIs, and determining which of the HARQ-ACKs of the one or more PDSCHs belong to one HARQ-ACK codebook according to the indication of the first parameter carried in the DCIs and determining a PUCCH resource corresponding to the HARQ-ACK codebook according to the PRI carried in the DCIs;

wherein the first parameter is used for indicating a HARQ-ACK codebook to which a HARQ-ACK corresponding to a PDSCH belongs;

wherein the k1 is used for indicating a uplink unit for transmitting a HARQ-ACK corresponding to a PDSCH, comprising: in a case where the PDSCH is transmitted in a unit n, the HARQ-ACK corresponding to the PDSCH is transmitted in a unit n+k1;

wherein the PRI is used for indicating a PUCCH resource corresponding to a HARQ-ACK corresponding to a PDSCH;

wherein the PUCCH resource corresponding to a HARQ-ACK codebook is determined according to the indication of the PRI in the last DCI corresponding to the HARQ-ACK codebook.

10. A non-transitory computer-readable storage medium, wherein the non-transitory computer-readable storage medium stores a computer program, wherein the computer program, when executed by a processor, implements the method according to claim 9.

11. An electronic device, wherein the electronic device stores a computer program, wherein the computer program, when executed by a processor, implements the method according to claim 9.

12. A non-transitory computer-readable storage medium, wherein the non-transitory computer-readable storage medium stores a computer program, wherein the computer program, when executed by a processor, implements the following operations:

transmitting Downlink Control Information (DCI) corresponding to a Physical Downlink Shared Channel (PDSCH) to a second communication node, wherein the DCI carries a first parameter, k1 and Physical Resource Indicator (PRI); and receiving, according to an indication of the first parameter, a Hybrid Automatic Repeat Request Acknowledgment (HARQ-ACK) corresponding to the PDSCH;

wherein receiving, according to the indication of the first parameter, the HARQ-ACK corresponding to the PDSCH comprises:

transmitting DCIs scheduling one or more PDSCHs, indicating one uplink unit for receiving the HARQ-ACK corresponding to the one or more PDSCHs according to the kl carried in the DCIs, and indicating which of the HARQ-ACKs of the one or more PDSCHs belong to one HARQ-ACK codebook according to the indication of the first parameter carried in the DCIs and indicating a PUCCH resource corresponding to the HARQ-ACK codebook according to the PRI carried in the DCIs;

wherein the first parameter is used for indicating a HARQ-ACK codebook to which a HARQ-ACK corresponding to a PDSCH belongs;

wherein the k1 is used for indicating a uplink unit for receiving a HARQ-ACK corresponding to a PDSCH, comprising: in a case where the PDSCH is transmitted in a unit n, the HARQ-ACK corresponding to the PDSCH is received in a unit n+k1;

wherein the PRI is used for indicating a PUCCH resource corresponding to a HARQ-ACK corresponding to a PDSCH;

wherein a PUCCH resource corresponding to a HARQ-ACK codebook is determined according to the indication of the PRI in the last DCI corresponding to the HARQ-ACK codebook.

13. The non-transitory computer-readable storage medium according to claim 12, wherein receiving, according to the indication of the first parameter, the HARQ-ACK corresponding to the PDSCH comprises:

transmitting DCIs scheduling one or more PDSCHs, indicating at least one of the following information according to the first parameter carried in the DCIs: a Physical Uplink Control Channel (PUCCH) corresponding to a HARQ-ACK codebook in an uplink unit; and a corresponding PUCCH of each HARQ-ACK corresponding to the PDSCH in an uplink unit; and receiving the HARQ-ACK corresponding to the PDSCH or receiving the HARQ-ACK codebook on the PUCCH.

14. The non-transitory computer-readable storage medium according to claim 12, wherein the first parameter is used for indicating at least one of the following information:

when the first parameter is a first numerical value, the first parameter is used for indicating that a PUCCH indicated by corresponding DCI is a first type of PUCCH, and when the first parameter is a second numerical value, the first parameter is used for indicating that a PUCCH indicated by corresponding DCI is a non-first type of PUCCH;

when the first parameter is a first numerical value, the first parameter is used for indicating that a HARQ-ACK of a PDSCH corresponding to corresponding DCI is the last HARQ-ACK of a HARQ-ACK codebook, and when the first parameter is a second numerical value, the first parameter is used for indicating that a HARQ-ACK of a PDSCH corresponding to corresponding DCI is not the last HARQ-ACK of a HARQ-ACK codebook, wherein the HARQ-ACK codebook is received on a PUCCH indicated by the last DCI in the DCI corresponding to the HARQ-ACK codebook;

when the first parameter is a first numerical value, the first parameter is used for indicating that corresponding DCI is DCI of the last PDSCH in a PDSCH corresponding to a HARQ-ACK codebook, and when the first parameter is a second numerical value, the first parameter is used for indicating that corresponding DCI is not DCI of the last PDSCH in a PDSCH corresponding to a HARQ-ACK codebook, wherein the HARQ-ACK codebook is received on a PUCCH indicated by the last DCI in the DCI corresponding to the HARQ-ACK codebook;

when the first parameter is a first numerical value, the first parameter is used for indicating that one or more HARQ-ACKs to be received prior to a HARQ-ACK of a PDSCH corresponding to current DCI is fed back in a HARQ-ACK codebook, the HARQ-ACK codebook is received on the PUCCH indicated by the DCI transmitted currently; and in response to the current DCI scheduling the PDSCH, the HARQ-ACK of the PDSCH scheduled by the current DCI is multiplexed with the one or more HARQ-ACKs to be received previously in one HARQ-ACK codebook, and the HARQ-ACK codebook is received on the PUCCH resource indicated by the current DCI.

15. The non-transitory computer-readable storage medium according to claim 12, wherein receiving, according to the indication of the first parameter, the HARQ-ACK corresponding to the PDSCH comprises:

transmitting DCIs scheduling one or more PDSCHs, indicating the second communication node selecting a Physical Uplink Control Channel (PUCCH) indicated by DCI with a first parameter which is a first numerical value as a second type of PUCCH; and receiving a HARQ-ACK codebook in the second type of PUCCH, wherein the HARQ-ACK codebook comprises one or more HARQ-ACKs, and the HARQ-ACK codebook comprises all HARQ-ACKs to be received between a current second type of PUCCH and a previous second type of PUCCH.

* * * * *